US012562134B2

(12) United States Patent
Orio et al.

(10) Patent No.: US 12,562,134 B2
(45) Date of Patent: Feb. 24, 2026

(54) LOCAL DIMMING FOR PANEL DISPLAY DEVICES USING TWO-DIMENSIONAL LIGHT SOURCE ARRAY

(71) Applicant: Synaptics Incorporated, San Jose, CA (US)

(72) Inventors: Masao Orio, Tokyo (JP); Takashi Nose, Kanagawa (JP); Hirobumi Furihata, Tokyo (JP); Tomoo Minaki, Tokyo (JP); Kazutoshi Aogaki, Kanagawa (JP)

(73) Assignee: Synaptics Incorporated, San Jose, CA (US)

(*) Notice: Subject to any disclaimer, the term of this patent is extended or adjusted under 35 U.S.C. 154(b) by 58 days.

(21) Appl. No.: 18/583,587

(22) Filed: Feb. 21, 2024

(65) Prior Publication Data

US 2025/0266007 A1 Aug. 21, 2025

(51) Int. Cl.

| | |
|---|---|
| ***G09G 3/34*** | (2006.01) |
| ***G09G 3/20*** | (2006.01) |
| ***G09G 3/36*** | (2006.01) |

(52) U.S. Cl.

CPC ......... *G09G 3/3426* (2013.01); *G09G 3/2074* (2013.01); *G09G 3/3607* (2013.01); *G09G 2300/0452* (2013.01); *G09G 2320/0626* (2013.01); *G09G 2320/066* (2013.01); *G09G 2330/021* (2013.01)

(58) Field of Classification Search

CPC .. G09G 3/3426; G09G 3/2074; G09G 3/3607; G09G 2300/0452; G09G 2320/0626; G09G 2320/066; G09G 2330/021

See application file for complete search history.

(56) References Cited

U.S. PATENT DOCUMENTS

| | | | | |
|---|---|---|---|---|
| 2009/0303171 | A1* | 12/2009 | Chang | G09G 3/3426 315/297 |
| 2012/0139974 | A1* | 6/2012 | Sakai | G09G 3/3426 345/102 |
| 2012/0268350 | A1* | 10/2012 | Yoshimura | G09G 3/3426 345/1.3 |
| 2024/0046835 | A1* | 2/2024 | Zhang | G09G 3/20 |
| 2025/0014527 | A1* | 1/2025 | Lee | G09G 3/342 |

* cited by examiner

*Primary Examiner* — David Tung

(74) *Attorney, Agent, or Firm* — Leydig, Voit & Mayer, Ltd.

(57) ABSTRACT

A display device includes a backlight device, a driver circuit, and a backlight control circuit. The backlight device includes an array of light sources configured to illuminate a display area of a display panel. The display area is segmented into zones corresponding to the light sources, respectively. The zones include inner zones and outmost zones. The inner light sources of the light source array are each located at a center of corresponding one of the inner zones. Each outmost zone is different in shape from at least one inner zone which is adjacent to at least one outmost zone. The backlight control circuit is configured to control a luminance level of a first outmost light source of the array of light sources based on pixel data of pixels in a first outmost zone of the outmost zones, and the first outmost light source corresponds to the first outmost zone.

20 Claims, 24 Drawing Sheets

LOCAL DIMMING FOR PANEL DISPLAY DEVICES USING TWO-DIMENSIONAL LIGHT SOURCE ARRAY

TECHNICAL FIELD

This disclosure relates generally to panel display devices and more particularly to local dimming for panel display devices using a two-dimensional light source array.

BACKGROUND

Panel display devices with a light-transmissive display panel (e.g., a light-transmissive liquid crystal display (LCD) panel) may incorporate a backlight device that illuminates the light-transmissive display panel. Modern backlight devices, such as direct-lit backlights, full-array backlights etc., may be configured to illuminate a display panel with a two-dimensional (2D) array of light sources (e.g., light-emitting diodes (LEDs)). The use of a 2D light source array in a backlight device enables the implementation of a local dimming function that can achieve high dynamic contrast and low power consumption by individually controlling the respective light sources (e.g., light-emitting diodes (LEDs)) of the 2D light source array according to input image data.

SUMMARY

This summary is provided to introduce, in a simplified form, a selection of concepts that are further described below. This summary is not necessarily intended to identify key features or essential features of the present disclosure. The present disclosure may include the following various aspects and embodiments.

In an exemplary embodiment, the present disclosure provides a display device. The display device includes a backlight device, a driver circuit, and a backlight control circuit. The backlight device includes an array of light sources configured to illuminate a display area of a display panel. The display area is segmented into a plurality of zones corresponding to the light sources, respectively. The plurality of zones includes inner zones and outmost zones. The inner zones correspond to inner light sources of the array of light sources and are located apart from edges of the display area of the display panel. Each of the inner light sources are located at a center of a respective inner zone. The outmost zones are located along the edges of the display area of the display panel and correspond to outmost light sources of the array of light sources. Each of the outmost zones is different in size or shape from at least one inner zone which is adjacent to at least one outmost zone. The driver circuit is configured to drive a plurality of pixels in the display area. The backlight control circuit is configured to control a luminance level of a first outmost light source of the array of light sources based on first pixel data of first pixels of the plurality of pixels, the first pixels being located in a first outmost zone of the outmost zones, the first outmost light source corresponding to the first outmost zone.

In another exemplary embodiment, the present disclosure provides a display driver that includes a driver circuit and a backlight control circuit. The driver circuit is configured to drive a plurality of pixels located in a display area of a display panel. The display area is illuminated by a backlight device that includes an array of light sources. The display area is segmented into a plurality of zones corresponding to the light sources, respectively. The plurality of zones include inner zones and outmost zones. The inner zones correspond to inner light sources of the array of light sources and are located apart from edges of the display area of the display panel. Each of inner light sources are located at a center of a respective inner zone. The outmost zones are located along the edges of the display and correspond to outmost light sources of the array of light sources. Each of the outmost zones is different in size or shape from at least one inner zone which is adjacent to at least one outmost zone. The backlight control circuit is configured to control a luminance level of a first outmost light source of the array of light sources based on first pixel data of first pixels of the plurality of pixels. The first pixels are located in a first outmost zone of the outmost zones, and the first outmost light source corresponds to the first outmost zone.

In yet another exemplary embodiment, the present disclosure provides a method for local dimming. The method includes illuminating a display area of a display panel by a backlight device comprising an array of light sources. The display area is segmented into a plurality of zones corresponding to the light sources, respectively. The plurality of zones includes inner zones and outmost zones. The inner zones correspond to inner light sources of the array of light sources and are located apart from edges of the display area of the display panel. Each of the inner light sources are located at a center of a respective inner zone. The outmost zones are located along the edges of the display area of the display panel and correspond to outmost light sources of the array of light sources. Each of the outmost zones is different in size or shape from at least one inner zone which is adjacent to at least one outmost zone. The method further includes driving a plurality of pixels located in the display area. The method further includes controlling a luminance level of a first outmost light source of the array of light sources based on first pixel data of first pixels of the plurality of pixels. The first pixels are located in a first outmost zone of the outmost zones, and the first outmost light source corresponds to the first outmost zone.

Other features and aspects are described in more detail below with reference to the attached drawings.

Figure 1A:
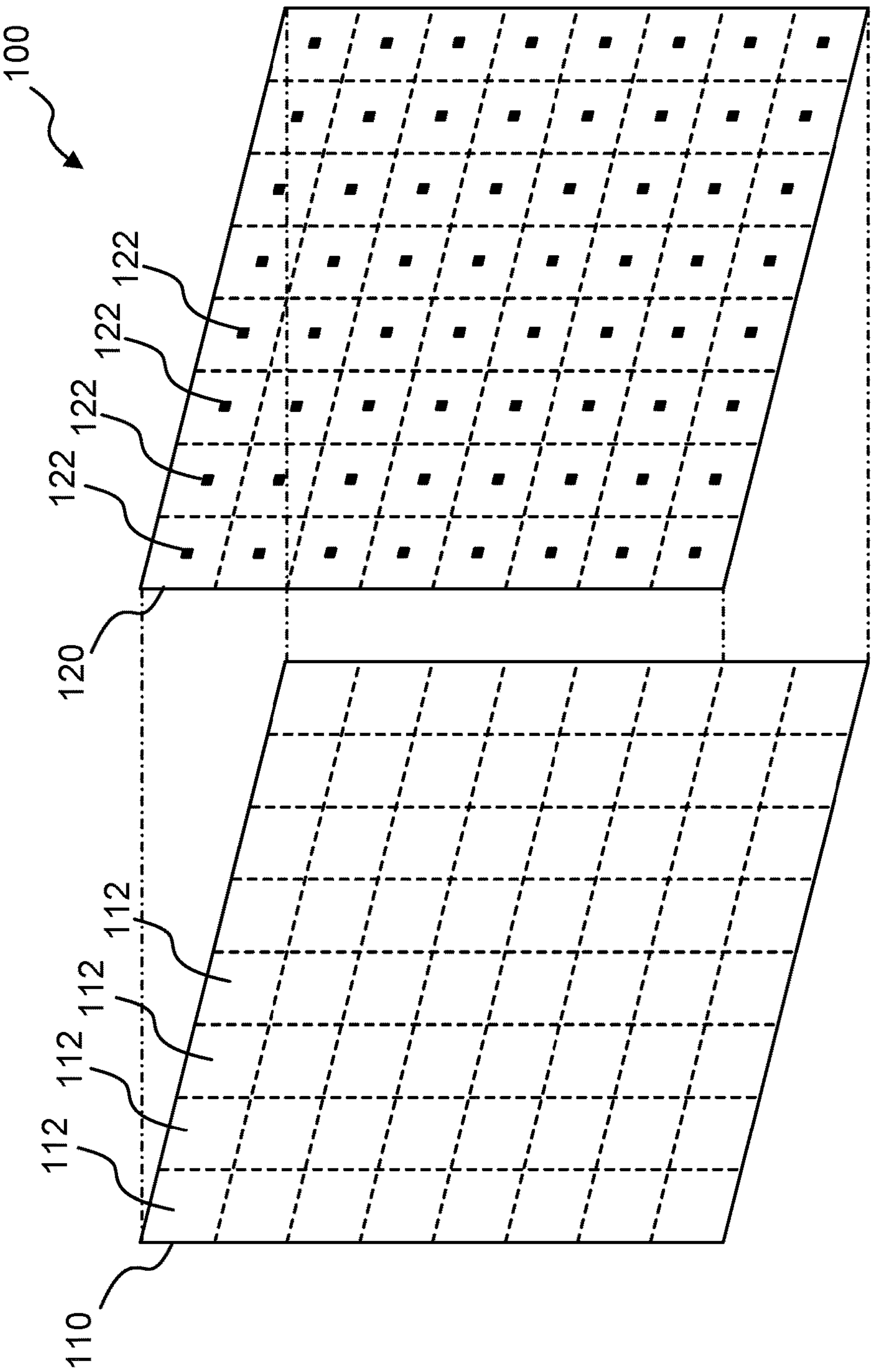
FIG. 1A shows an example configuration of a display device adapted to local dimming, according to one or more examples of the present disclosure.

For ease of understanding, where possible, identical reference numerals have been used to designate elements that are common to the figures. It is contemplated that elements disclosed in one embodiment may be utilized in other embodiments without specific recitation. Suffixes may be appended to reference numerals to distinguish elements from one another. The drawings referenced herein are not to be construed as being drawn to scale unless specifically noted. In addition, the drawings are often simplified and details or components are omitted for clarity of presentation and explanation. The drawings and discussion serve to explain principles discussed below.

DETAILED DESCRIPTION

The following detailed description is exemplary in nature and is not intended to limit the disclosure or the applications and uses of the disclosure. Further, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The present disclosure provides various techniques for achieving a local dimming function. Local dimming, as referred to herein, is a technique that individually controls the respective light sources (e.g., light-emitting diodes (LEDs)) of a 2D light source array according to input image data. By using the local dimming function, high dynamic contrast and low power consumption may be effectively achieved.

FIG. 1A shows an example configuration of a display device 100 adapted to the local dimming, according to one or more examples of the present disclosure. In the shown example, a display device 100 includes a light-transmissive display panel 110 (e.g., a light-transmissive liquid crystal display (LCD) panel) and a backlight device 120 configured to illuminate the display panel 110. The backlight device 120 includes a 2D array of light sources 122 each including a light emitting diode (LED) or other type of light emitting element.

To implement a local dimming function, the luminance levels of the respective light sources 122 may be individually controlled based on input image data. In some implementations, to enhance the contrast of the display image, the luminance levels of light sources 122 that illuminate portions of the display panel 110 that display bright images may be increased, while the luminance levels of light sources 122 that illuminate portions of the display panel 110 that display dark images may be decreased.

In various implementations, the luminance levels of the light sources 122 may be controlled based on "zones" defined for the display panel 110. The zones 112 may be defined in rows and columns such that the zones 112 are in a one-to-one relationship with the light sources 122, and the luminance levels of the respective light sources 122 may be controlled based on the images displayed in the corresponding zones 112.

Figure 1B:
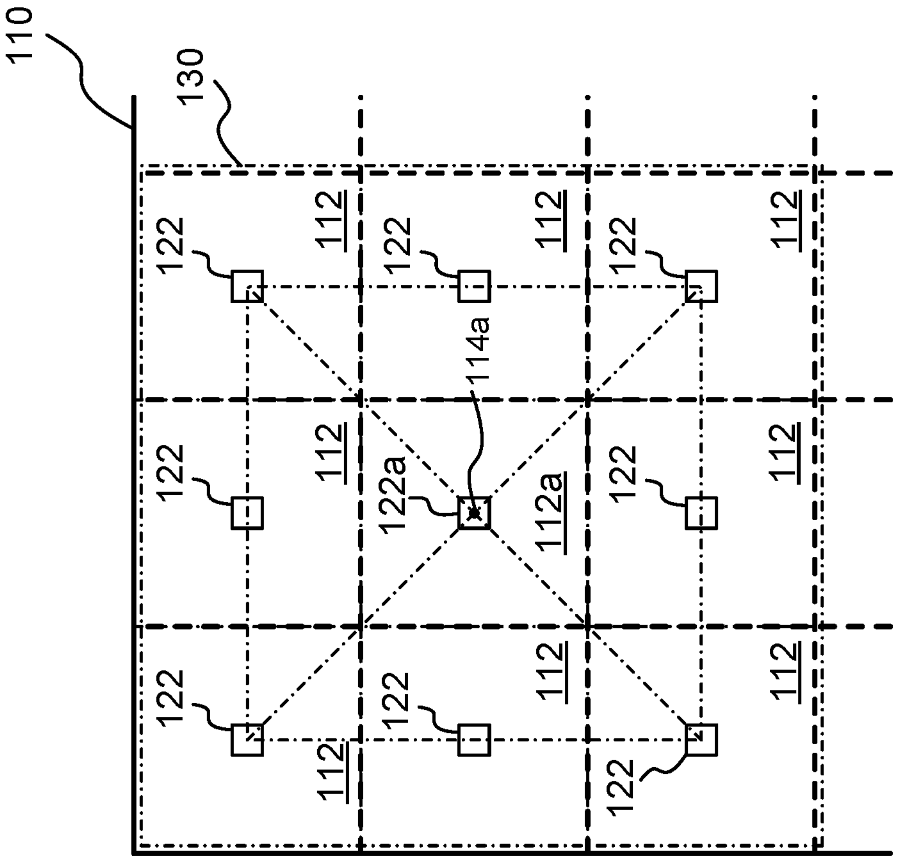
FIG. 1B shows example arrangements of zones of a display panel and light sources that illuminate the display panel, according to one or more examples of the present disclosure.

FIG. 1B shows an example arrangement of the zones 112 of the display panel 110 and the light sources 122, according to one or more examples of the present disclosure. In the shown example, the zones 112 are square in shape with the same size, and the projection of each light source 122 onto the display panel 110 is each located at the center of the corresponding zone 112. It should be noted that when the projection of a light source 122 falls within a zone 112, that zone 112 may be referred to as the corresponding zone 112 of the light source 122. In FIG. 1B, the numeral 112*a* denotes the corresponding zone of the light source 122*a*. In one implementation, the luminance level of each light source 122 may be controlled based on pixel data of pixels located in the corresponding zone 112 of that light source 122 and pixels located in the zones 112 adjacent to the corresponding zone 112. In the example shown in FIG. 1B, for example, the luminance level of the light source 122*a* may be controlled based on pixel data of the pixels located in the corresponding zone 112*a* and the eight zones 112 adjacent to the corresponding zone 112*a*. The box 130 indicates the 3×3 zones relevant to the control of the luminance level of the light source 122*a*.

Since the effect of the local dimming function varies depending on the light distribution characteristics (or light directivity characteristics) of the light sources 122, it would be advantageous if the control of the luminance levels of the light sources 122 depends on the light distribution characteristics of the light sources 122. One scheme to accomplish this is to perform filtering on pixel data depending on the light distribution characteristics of the light sources 122. In one implementation, controlling the luminance level of a light source 122 may be accomplished by defining filter coefficients based on the light distribution characteristics of the light source 122, applying the filter coefficients to pixel data of the pixels located in the corresponding zone 112*a* and its adjacent zones 112 to thereby produce filtered pixel data, and determining the luminance level of that light source 122 based on the filtered pixel data.

Figure 2:
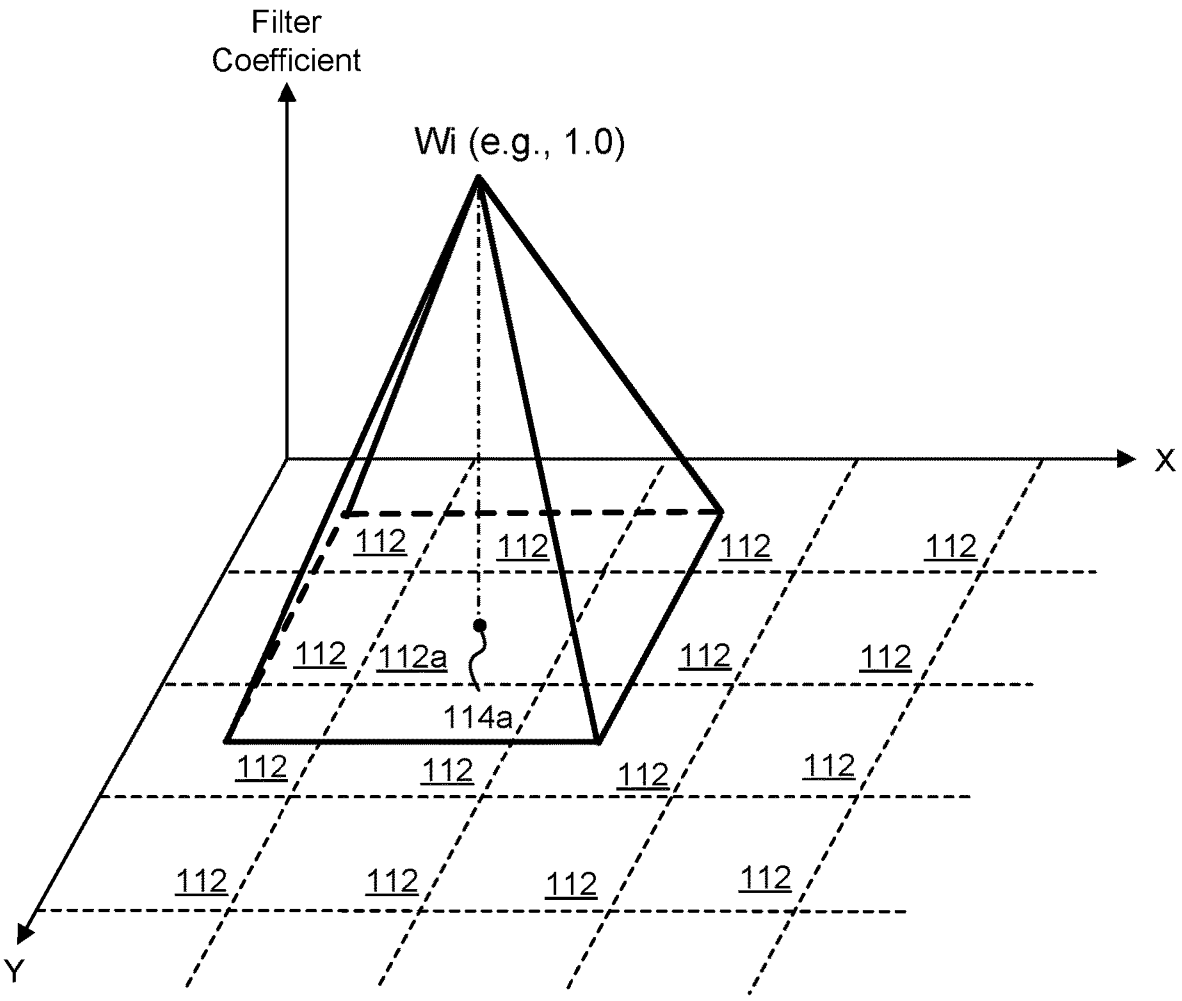
FIG. 2 shows an example of filter coefficients used to control the luminance level of a light source, according to one or more examples of the present disclosure.

FIG. 2 shows an example of filter coefficients used to control the luminance level of the light source 122*a* (shown in FIG. 1B), according to one or more examples of the present disclosure. In FIG. 2, numeral 114*a* denotes the center of the corresponding zone 112*a* of the light source 122*a*, which coincides the location of the projection of the light source 122*a* onto the display panel 110. In the shown example, the filter coefficients assigned to the pixels in the corresponding zone 112*a* and its adjacent zones 112 depend on the respective distances between the pixels and the center 114*a* of the corresponding zone 112*a*. The filter coefficient for the pixel positioned at the center 114*a* of the corresponding zone 112*a* is Wi (e.g., 1.0), which is the maximum filter coefficient. The filter coefficients determined for other pixels in the corresponding zone 112*a* and its adjacent zones 112 increase as the respective distances between the pixels and the center 114*a* of the corresponding zone 112*a* decrease. It should be noted that the filter coefficients are determined in symmetrically with respect to the center 114*a* of the corresponding zone 112*a* in view of the light distribution characteristics of the light source 122*a*. The filter coefficients used to control the luminance levels of other light sources 122 may be determined in a similar manner.

Figure 3A:
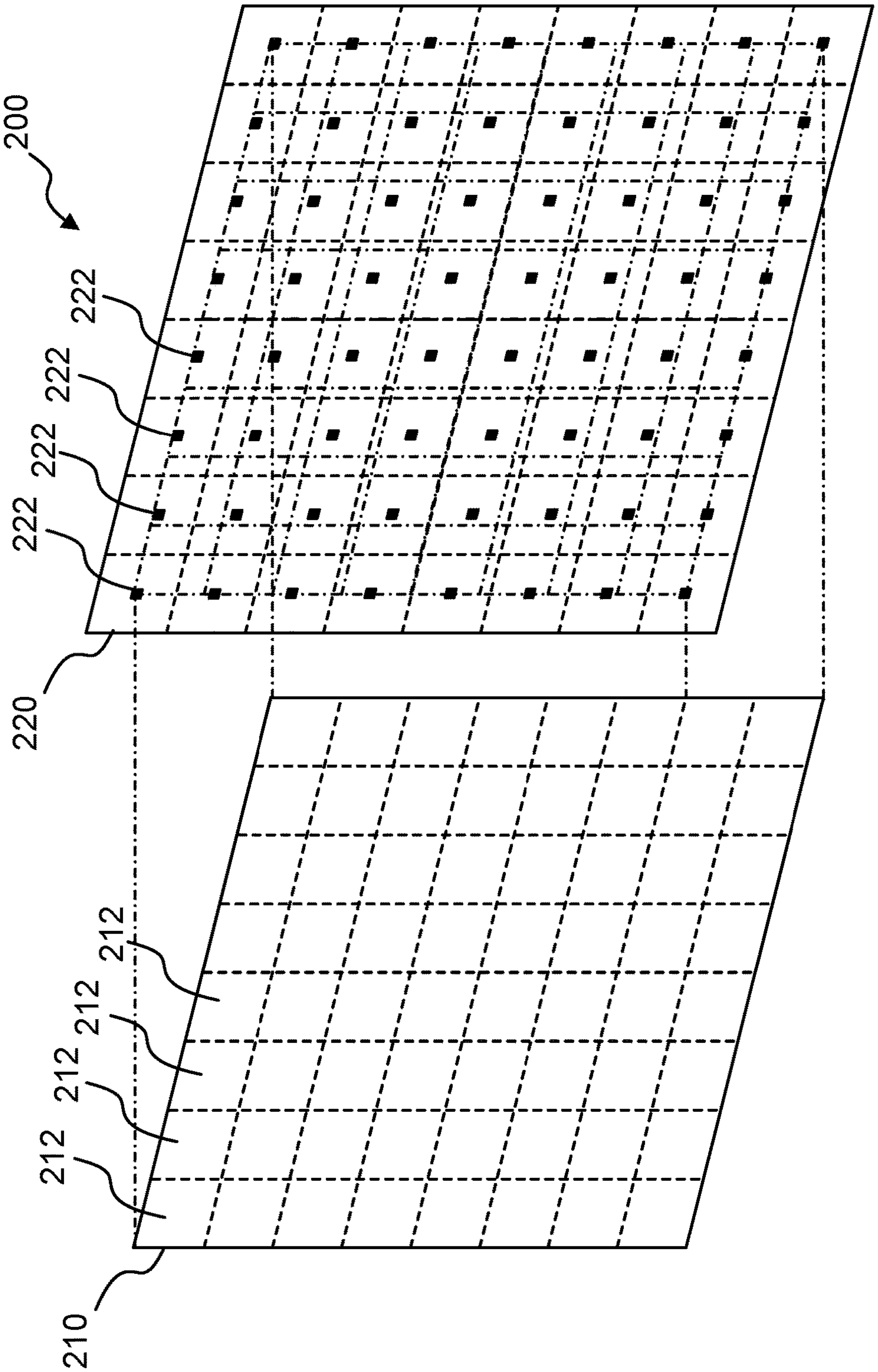
FIG. 3A shows an example configuration of a display device, according to one or more examples of the present disclosure.

One issue is that the arrangement of the light sources of the backlight device may not match the arrangement of the zones. FIG. 3A shows an example configuration of such a display device, denoted by numeral 200, according to one or more examples of the present disclosure. The display device 200 includes a display panel 210 for which zones 212 are defined in rows and columns and a backlight device 220 that includes an array of light sources 222. In the shown example, the zones 212 are defined with the same size and shape (e.g., the same width and height), as in typical implementations. The light sources 222 are arranged at regular intervals, but not necessary located at the centers of the corresponding zones 212. For example, the outmost light sources 222 are located near the edge of the display panel 210. Such situations may occur due to physical limitations of the arrangement of the light sources 222, including the possible minimum spacing between adjacent light sources 222 and commercial availability of the backlight device 220. Locating the outmost light sources 222 near the edge of the display panel 210 may also help to illuminate the periphery of the display panel 210 with sufficient luminance.

Figure 3B:
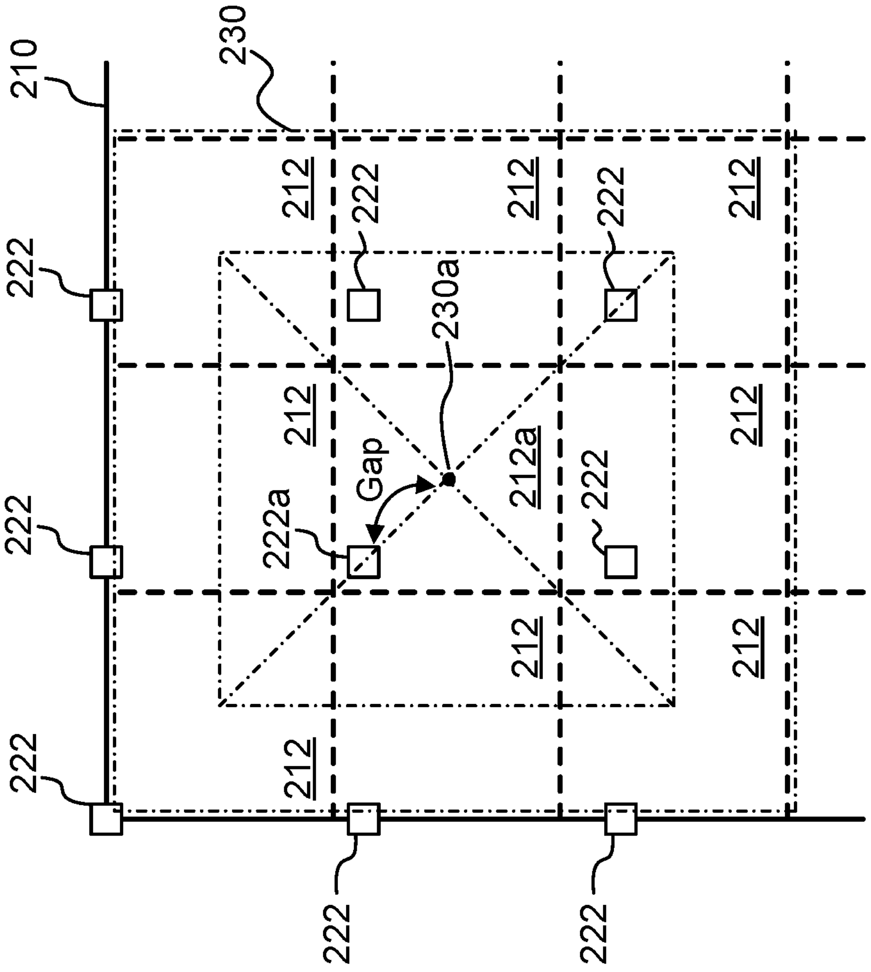
FIG. 3B is an enlarged view of example arrangements of zones and the light sources, according to one or more examples of the present disclosure.

FIG. 3B is an enlarged view of example arrangements of the zones 212 and the light sources 222, according to one or more examples of the present disclosure. The box 230 indicates the 3×3 zones relevant to the control of the luminance level of the light source 222*a*, which include the corresponding zone 212*a* and its adjacent zones 212. It should be noted that in implementations where the outmost light sources 222 are located near the edge of the display panel 210 with the zones 212 defined with the same size and shape, the light sources 222 may not be located at the centers of the corresponding zones 212. In the example shown in FIG. 3B, for example, the light source 222*a* located in the second row from the top and the second column from the left is not located at the center of its corresponding zone 212*a*, which is located in the second row from the top and the second column from the left in the array of the zones 212. The gap between the location of each light source 222 and the center of its corresponding zone 212 may degrade the image quality of the display image displayed using the local dimming function. This is because the filter coefficients used to control the luminance level of each light source 222 are determined symmetrically with respect to the center of the corresponding zone 212 of that light source 222, not symmetrically with respect to the location of that light source 222.

In one aspect, the present disclosure provides local dimming techniques for improving the image quality even when the arrangement of the light sources of the backlight device does not match the arrangement of the zones defined for the display panel. The present disclosure recognizes that defining zones for a display panel with the same size and shape (or the same width and height) may result in a gap between the location of each light source and the center of its corresponding zone. Accordingly, in one or more embodiments of the present disclosure, zones used for implementing the local dimming function may be defined such that the outmost zones corresponding to the outmost light sources of the light source array are different in size or shape from the inter zones corresponding to the inner light sources of the light source array. The inner zones may be defined such that the inner light sources of the light source array are located at the centers of the respective inner zones. The outmost zones may be defined as the respective overlapping areas of "extended" zones and the display area of the display panel, wherein the extended zones are defined such that the extended zones have the same size and shape as their adjacent ones of the inner zones and the outmost light sources are located at the centers of the respective extended zones. The filter coefficients used for controlling each inner light source may be defined symmetrically with respect to the center of the corresponding inner zone of that inner light source. The filter coefficients used for controlling each outmost light source may be defined symmetrically with respect to the center of the corresponding "extended" zone of that outmost light source. This enables controlling the luminance levels of the outmost light sources in line with the light distribution characteristics of the outmost light sources. Various embodiments of the present disclosure are described in detail below.

Figure 4A:
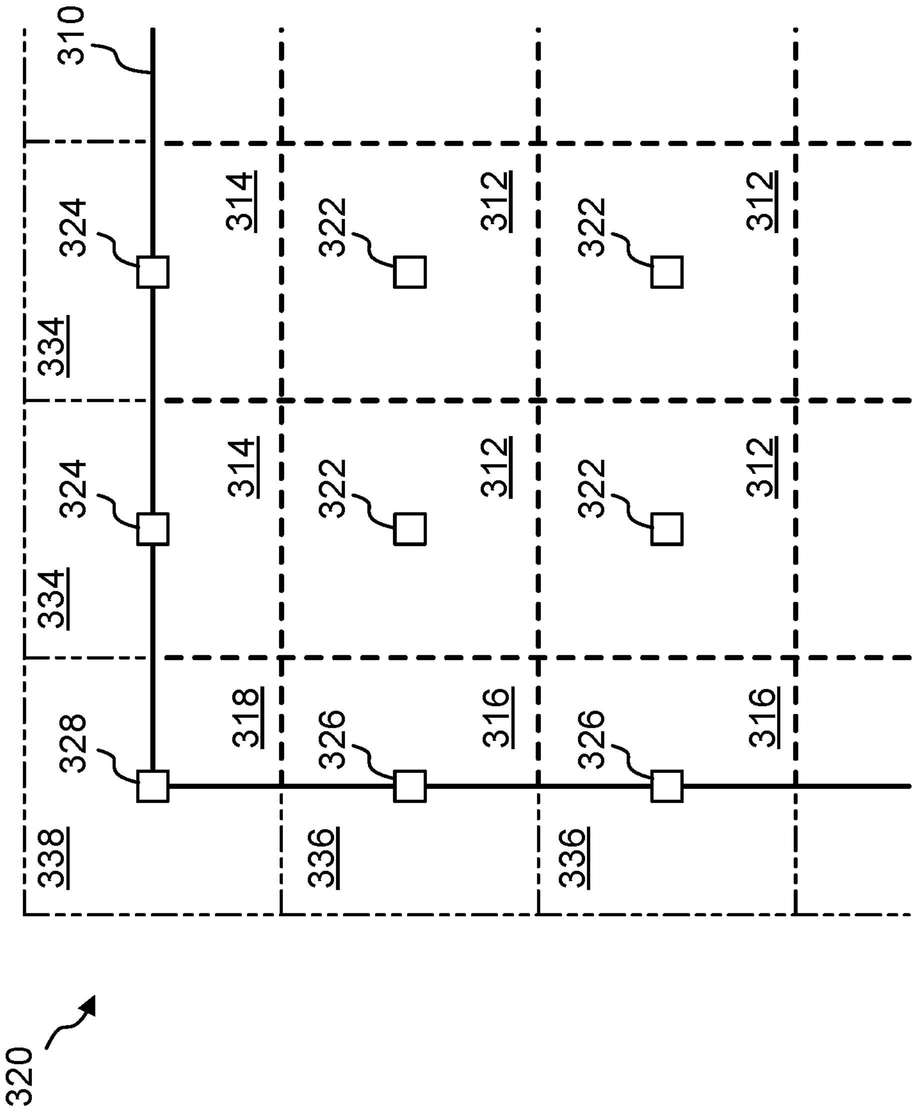
FIG. 4A shows an example definition of zones for a display panel, according to one or more embodiments.

FIG. 4A shows an example definition of zones for a display panel, according to one or more embodiments. In the shown embodiments, numeral 310 denotes a display area of a display panel. The display area 310 is an area in which pixels are arranged to display an image. The display area 310 may be a portion of the display panel, and an array of zones is defined for the display panel by segmenting the display area 310. The zones defined for the display area 310 include inner zones 312 and outmost zones 314, 316, and 318. The inner zones 312 correspond to inner light sources 322 of the light source array and are located apart from the edges of the display area 310. In various embodiments, the inner zones 312 are substantially rectangular. In the shown embodiment, the inner zones 312 are square in shape. Although FIG. 4A shows that all of the inner zones 312 have the same size and shape, the sizes or shapes of the inner zones 312 may be non-uniform as long as the inner zones 312 form a rectangular array. In some implementations, the horizontal width of inner zones 312 in a first set of columns may be different from the horizontal width of inner zones 312 in a second set of columns. Additionally or alternatively, the vertical height of inner zones 312 in a first set of rows may be different from the vertical height of inner zones 312 in a second set of rows.

The outmost zones 314, 316, and 318 are located along the edges of the display area 310. The outmost zones 314, 316, and 318 are different in size or shape from their adjacent ones of the inner zones 312. The outmost zones 314, which are located at the top edge of the display area 310, may also be referred to as the top edge zones 314. Similarly, the outmost zones 316, which are located at the side edge of the display area 310, may also be referred to as the side edge zones 316, and the outmost zones 318 (one shown), which are located at the corners of the display area 310, may also be referred to as the corner zones 318.

The outmost zones 314 are defined as the overlapping areas of "extended" zones 334 and the display area 310, wherein the "extended" zones 334 have the same size and shape as the inner zones 312 adjacent to the outmost zones 314, respectively, and the outmost light sources 324 of the light source array are located at the centers of the "extended" zones 334, respectively. It should be noted that the concept of the "extended" zones 334 is introduced only to define the outmost zones 314, and therefore there are no pixels in the portions that are within the extended zones 334 but outside the display area 310.

Similarly, the outmost zones 316 are defined as the overlapping areas of extended zones 336 and the display area 310, wherein the extended zones 336 have the same size and shape as the inner zones 312 adjacent to the outmost zones 316, respectively, and the outmost light sources 326 of the light source array are located at the centers of the "extended zones" 336, respectively. Further, the outmost zone 318 is defined as the overlapping area of an extended zone 338 and the display area 310, wherein the extended zone 338 has the same size and shape as the inner zone 312 diagonally adjacent to the outmost zone 318. Although not shown in FIG. 4A, those skilled in the art would appreciate that other inner zones and other outmost zones are defined for the remaining part of the display area 310 in a similar manner.

Figure 4B:
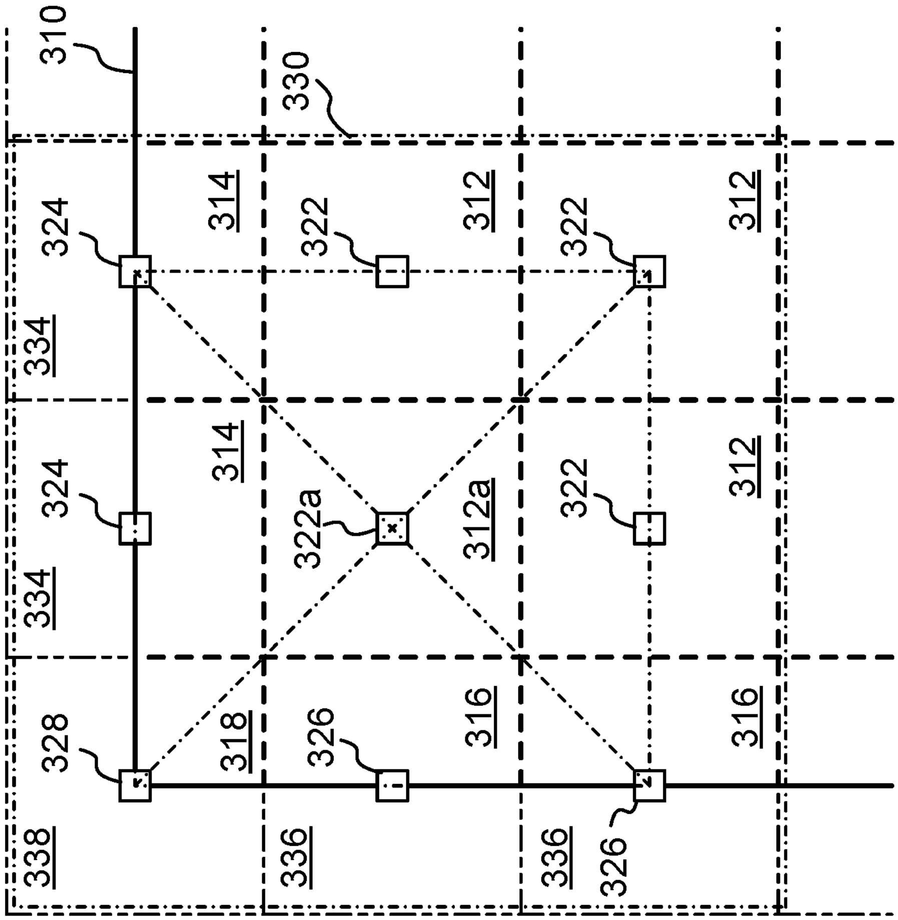
FIG. 4B shows an example of filter coefficients used to control the luminance level of a light source, according to one or more embodiments.

Referring to FIG. 4B, the filter coefficients used to control the luminance level of each inner light source 322 may be defined symmetrically with respect to the center of the corresponding inner zone 312 of that inner light source 322. For example, the box 330 indicates the 3×3 zones relevant to the control of the luminance level of the light source 322*a*, wherein the 3×3 zones include the corresponding zone 312*a*, the three inner zones 312 adjacent to the corresponding zone 312*a*, and the five "extended" zones 334, 336, and 338 adjacent to the corresponding zone 312*a*. The filter coefficients used for controlling the luminance level of the inner light source 322*a* may be defined symmetrically with respect to the center of the corresponding inner zone 312*a*. Similarly, the filter coefficients used for controlling the luminance level of each of the outmost light sources 324, 326, and 328 may be defined symmetrically with respect to the center of the corresponding "extended" zone 334, 336, or 338 of that outmost light source. Defining the filter coefficients in this manner enables performing the local dimming function based on the light distribution characteristics of the light sources 322, 324, 326, and 328, improving the image quality of the display image generated by the local dimming function.

Figure 5:
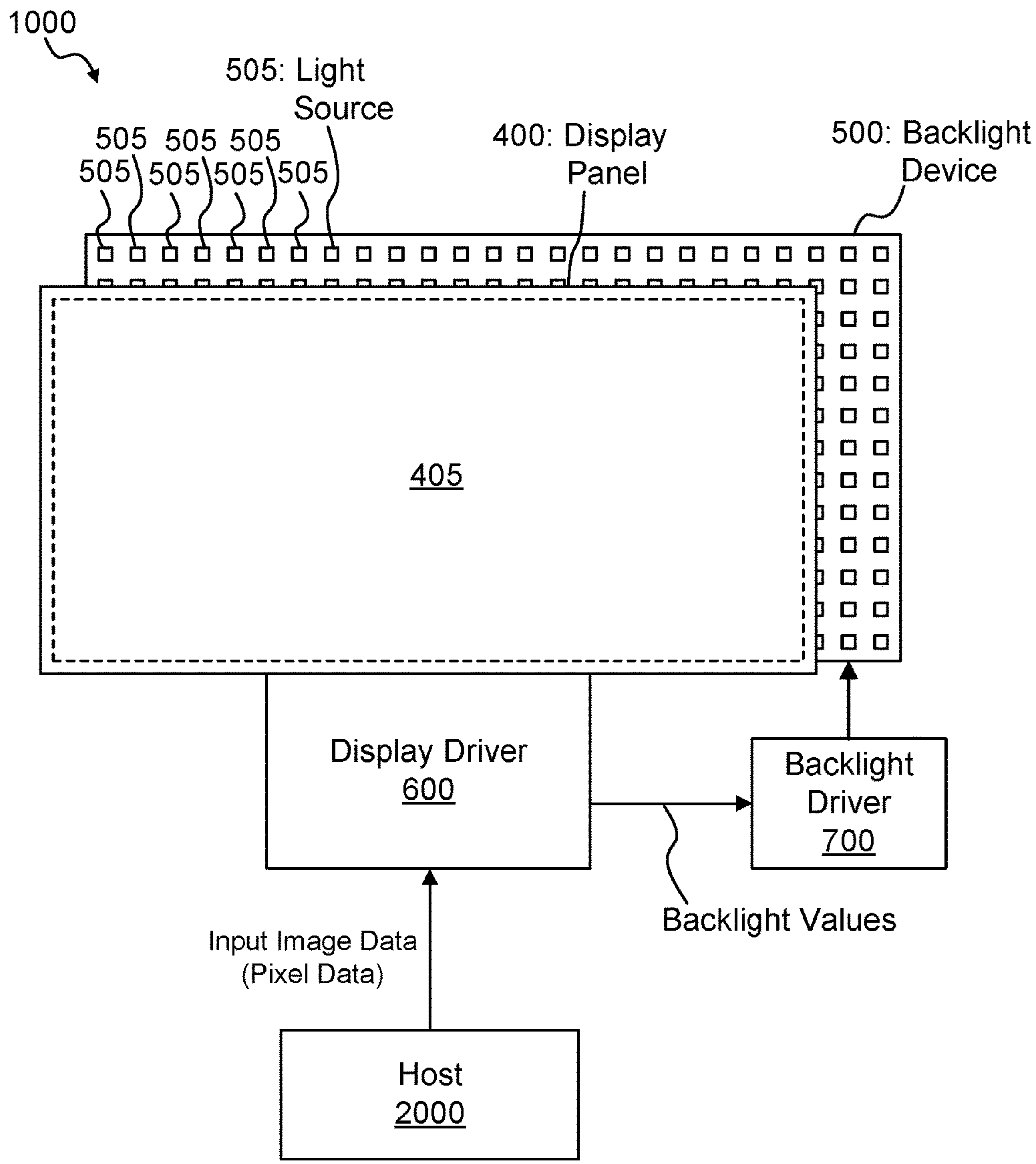
FIG. 5 shows an example configuration of a display device, according to one or more embodiments.

FIG. 5 shows an example configuration of a display device 1000, according to one or more embodiments. In the shown embodiment, the display device 1000 includes a display panel 400 and a display driver 600. The display panel 400 includes a display area 405 in which pixels are arranged to display an image. The display panel 400 may be a light-transmissive display panel, such as an LCD panel. The display driver 600 is configured to drive the display panel 400 to display a desired image on the display panel 400.

The display device 1000 further includes, a backlight device 500, and a backlight driver 700. The backlight device 500 is configured to illuminate the display area 405 of the display panel 400. The backlight device 500 includes an array of light sources 505. It should be noted that only some of the light sources 505 are shown in FIG. 5, as the light sources 505 are located behind the display panel 400. In one implementation, each light source 505 may include an LED or other type of light source. The backlight device 500 is coupled to the backlight driver 700. The backlight driver 700 is configured to drive the light sources 505 of the backlight device 500 under the control of the display driver 600 so that each light source 505 emits light with a luminance level specified by the display driver 600.

Figure 6:
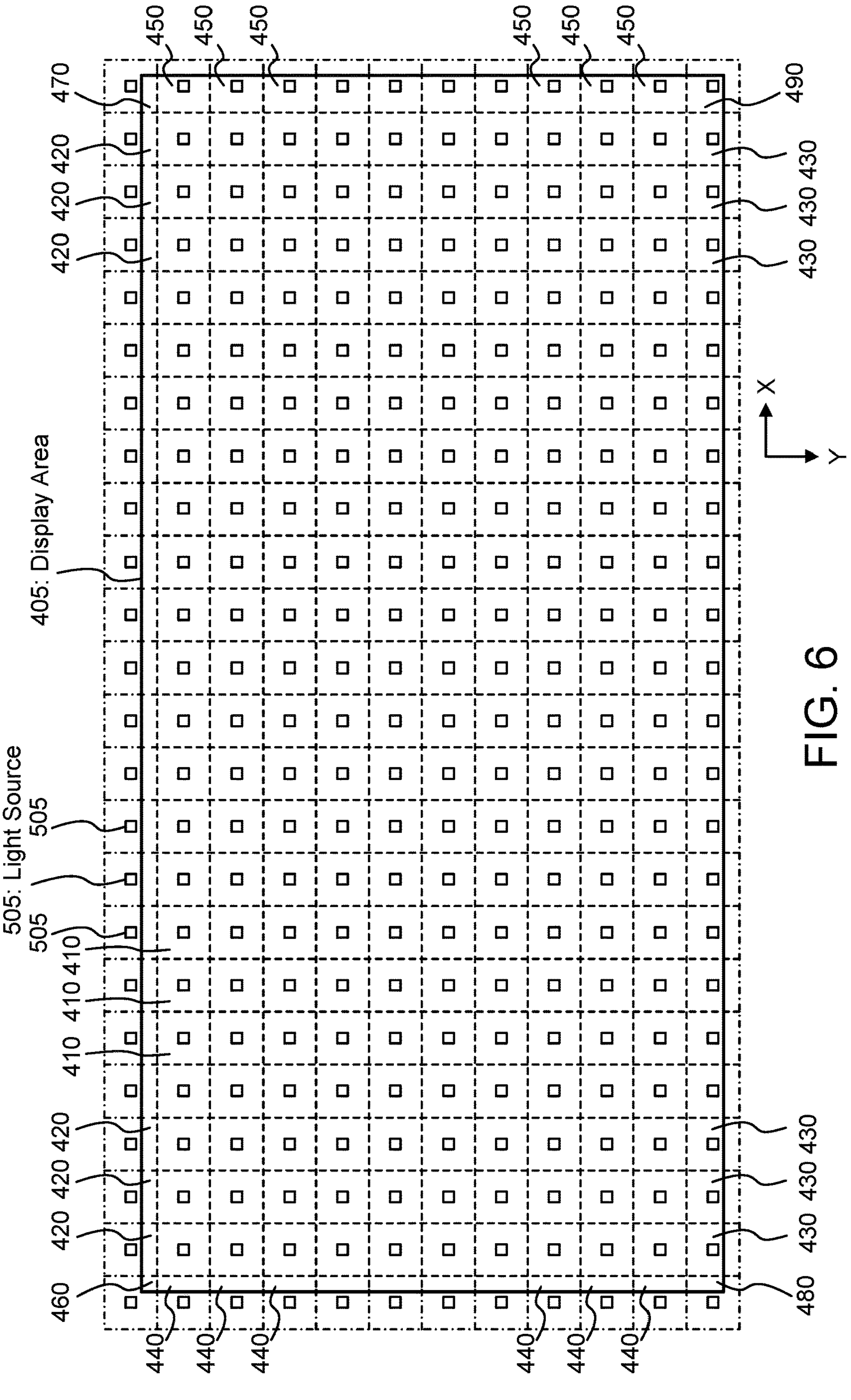
FIG. 6 shows an example arrangement of light sources of the backlight device and an example definition of zones for a display panel, according to one or more embodiments.

FIG. 6 shows an example arrangement of the light sources 505 of the backlight device 500 and an example definition of zones for the display panel 400, according to one or more embodiments. The light sources 505 are arranged in rows and columns. While 288 light sources 505 are shown in FIG. 6, those skilled in the art would appreciate that the backlight device 500 may include more or less than 288 light sources 505. In actual implementations, the backlight device 500 may include from several hundred to several thousand light sources 505. The zones are defined for the display panel 400 by segmenting the display area 405. In the shown embodiment, the zones are substantially rectangular in shape. The defined zones include inner zones 410 and outmost zones 420, 430, 440, 450, 460, 470, 480, and 490. The inner zones 410 correspond to inner light sources of the array of light sources 505, respectively, and are located apart from the edges of the display area 405. Although FIG. 6 shows that all of the inner zones 410 have the same size and shape (or the same width and height), the sizes and/or shapes of the inner zones 410 may be non-uniform as long as the inner zones 410 form a rectangular array. In some implementations, the horizontal width of inner zones 410 in a first set of columns may be different from the horizontal width of inner zones 410 in a second set of columns. Additionally or alternatively, the vertical height of inner zones 410 in a first set of rows may be different from the vertical height of inner zones 312 in a second set of rows.

The outmost zones 420, 430, 440, 450, 460, 470, 480, and 490 are located along the edges of the display area 405 and correspond to outmost light sources of the array of light sources 505, respectively. The outmost zones 420, 430, 440, 450, 460, 470, 480, and 490 are different in size or shape (or width and/or height) from their adjacent ones of the inner zones 410.

The outmost zones 420, 430, 440, and 450 are located at the edges of the display area 405. More specifically, the outmost zones 420 are located at the top edge of the display area 405, and therefore the outmost zones 420 may also be referred to as the top edge zones 420. The outmost zones 430 are located at the bottom edge of the display area 405, and therefore the outmost zones 430 may also be referred to as the bottom edge zones 430. The outmost zones 440 are located at the left edge of the display area 405, and therefore the outmost zones 440 may also be referred to as the left edge zones 440. The outmost zones 450 are located at the right edge of the display area 405, and therefore the outmost zones 450 may also be referred to as the right edge zones 450.

The outmost zones 460, 470, 480, and 490 are located at the corners of the display area 405. The outmost zone 460 is located at the left top corner of the display area 405, and therefore the outmost zone 460 may also be referred to as the left top corner zone 460. The outmost zone 470 is located at the right top corner of the display area 405, and therefore the outmost zone 470 may also be referred to as the right top corner zone 470. The outmost zone 480 is located at the left bottom corner of the display area 405, and therefore the outmost zone 480 may also be referred to as the left bottom corner zone 480. The outmost zone 490 is located at the right bottom corner of the display area 405, and therefore the outmost zone 490 may also be referred to as the right bottom corner zone 490.

Figure 7A:
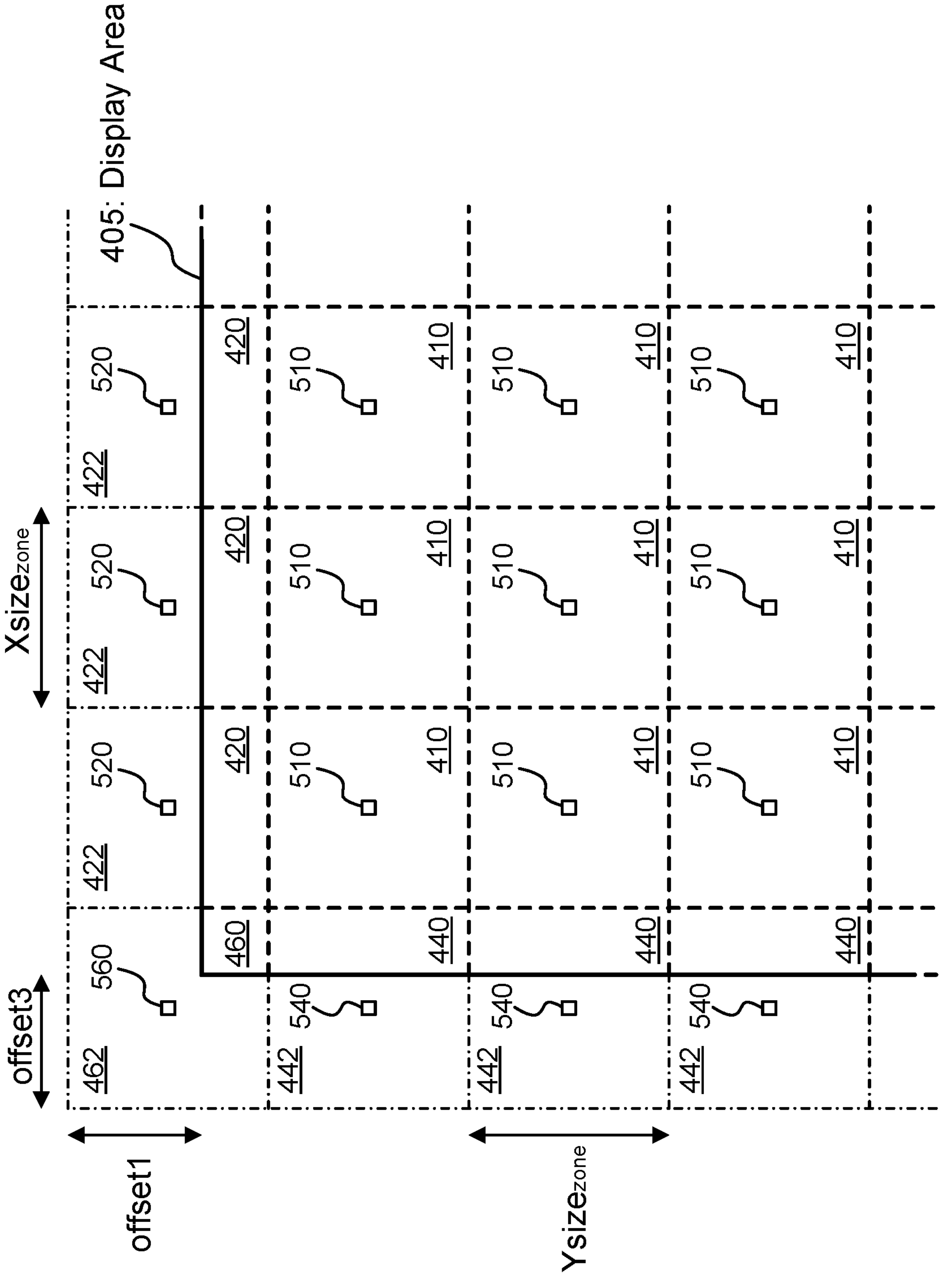
FIG. 7A shows an enlarged view of the left top corner of a display area, according to one or more embodiments.

FIG. 7A shows an enlarged view of the left top corner of the display area 405, according to one or more embodiments. The inner zones 410 correspond to inner light sources 510, respectively, and the respective inner light sources 510 are located at the centers of the corresponding inner zones 410, respectively. The width and height of the inner zones 410 are $Xsize_{zone}$ and $Ysize_{zone}$, respectively. The inner zones 410 may be square in shape, i.e., $Xsize_{zone}$ and $Ysize_{zone}$ may be equal to each other.

As discussed above in relation to FIGS. 4A and 4B, the top edge zones 420, the left edge zones 440, and the left top corner zone 460 are defined using "extended" zones that have the same size and shape as their adjacent ones of the inner zones 410, respectively. More specifically, the top edge zones 420 are respectively defined as the overlapping areas of the top edge extended zones 422 and the display area 405, wherein the top edge extended zones 422 have the same size and shape as the inner zones 410 adjacent to the top edge zones 420, and the top edge outmost light sources 520 are respectively located at the centers of the top edge extended zones 422. The left edge zones 440 are respectively defined as the overlapping areas of the left edge extended zones 442 and the display area 405, wherein the left edge extended zones 442 have the same size and shape as the inner zones 410 adjacent to the left edge zones 440, and the left edge outmost light sources 540 are located at the centers of the left edge extended zones 442, respectively. The left top corner zone 460 is defined as the overlapping area of a left top corner extended zone 462 and the display area 405, wherein the left top corner extended zone 462 has the same size and shape as the inner zone 410 diagonally adjacent to the left top corner zone 460, and the left top corner outmost light source 560 is located at the center of the left top corner extended zone 462. In FIG. 7A, "offset1" is the offset in the vertical direction between the top edge of the display area 405 and the top edges of the extended zones 422 and 462, and "offset3" is the offset in the horizontal direction between the left edge of the display area 405 and the left edges of the extended zones 422 and 462.

Figure 7B:
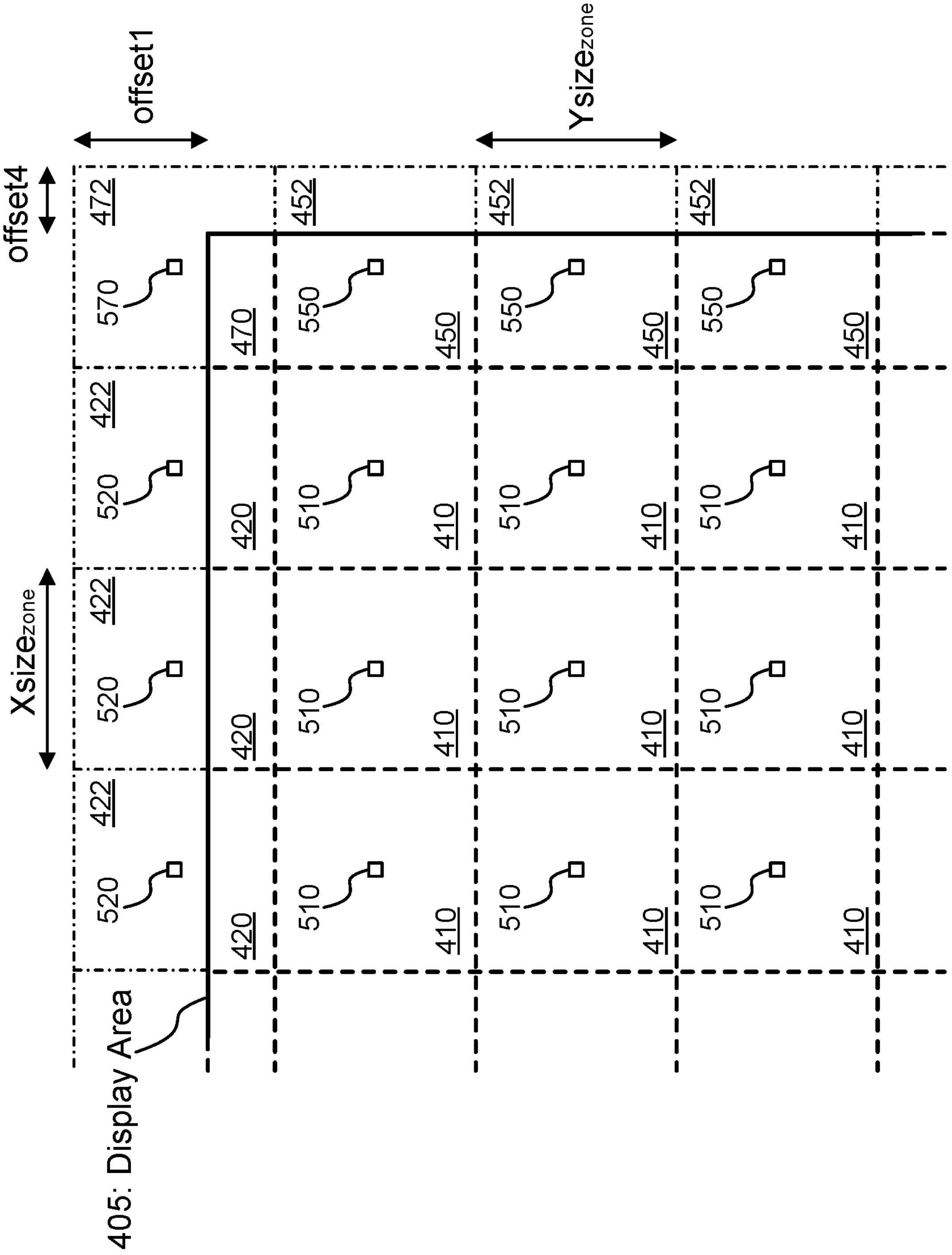
FIG. 7B shows an enlarged view of the right top corner of the display area, according to one or more embodiments.

FIG. 7B shows an enlarged view of the right top corner of the display area 405, according to one or more embodiments. The right edge zones 450 and the right top corner zone 470 are defined in a manner similar to the top edge zones 420, the left edge zones 440, and the left top corner zone 460 shown in FIG. 7A. More specifically, the right edge zones 450 are respectively defined as the overlapping areas of the right edge extended zones 452 and the display area 405, wherein the right edge extended zones 452 have the same size and shape as the inner zones 410 adjacent to the right edge zones 450, and the right edge outmost light sources 550 are located at the centers of the right edge extended zones 452, respectively. The right top corner zone 470 is defined as the overlapping area of the right top corner extended zone 472 and the display area 405, wherein the right top corner extended zone 472 has the same size and shape as the inner zone 410 diagonally adjacent to the right top corner zone 470, and the right top corner outmost light source 570 is located at the center of the right top corner extended zones 472. In FIG. 7B, "offset4" is the offset in the horizontal direction between the right edge of the display area 405 and the right edges of the extended zones 452 and 472.

Figure 7C:
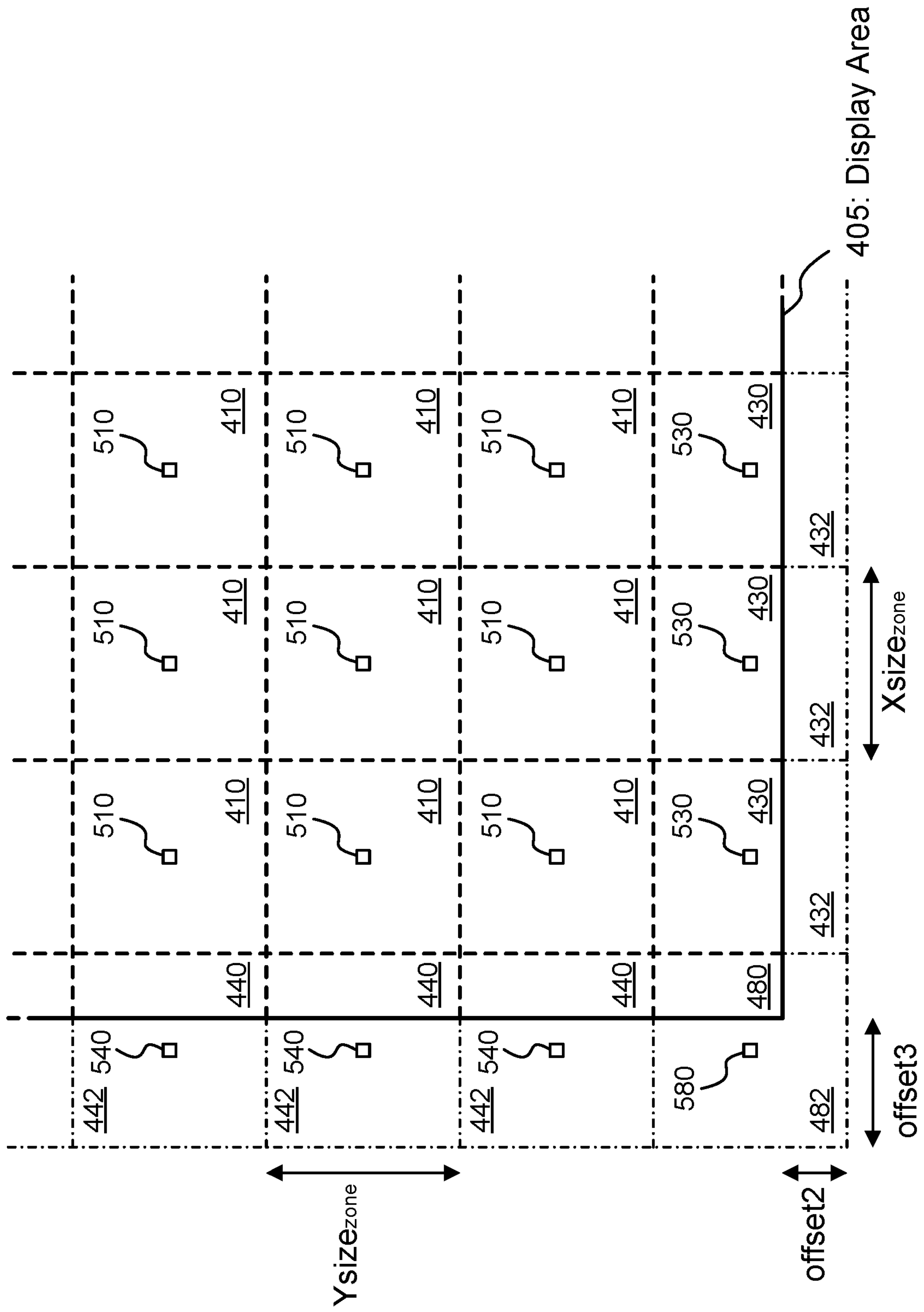
FIG. 7C shows an enlarged view of the left bottom corner of the display area, according to one or more embodiments.

FIG. 7C shows an enlarged view of the left bottom corner of the display area 405, according to one or more embodiments. The bottom edge zones 430 and the left bottom corner zone 480 are defined in a manner similar to the top edge zones 420 and the left top corner zone 460 shown in FIG. 7A. More specifically, the bottom edge zones 430 are respectively defined as the overlapping areas of the bottom edge extended zones 432 and the display area 405, wherein the bottom edge extended zones 432 have the same size and shape as the inner zones 410 adjacent to the bottom edge zones 430, and the bottom edge outmost light sources 530 are located at the centers of the bottom edge extended zones 432, respectively. The left bottom corner zone 480 is defined as the overlapping area of the left bottom corner extended zone 482 and the display area 405, wherein the left bottom corner extended zone 482 has the same size and shape as the inner zone 410 diagonally adjacent to the left bottom corner zone 480, and the left bottom corner outmost light source 580 is located at the center of the left bottom corner extended zone 482. In FIG. 7C, "offset2" is the offset between the bottom edge of the display area 405 and the bottom edges of the extended zones 432 and 482 in the vertical direction.

Figure 7D:
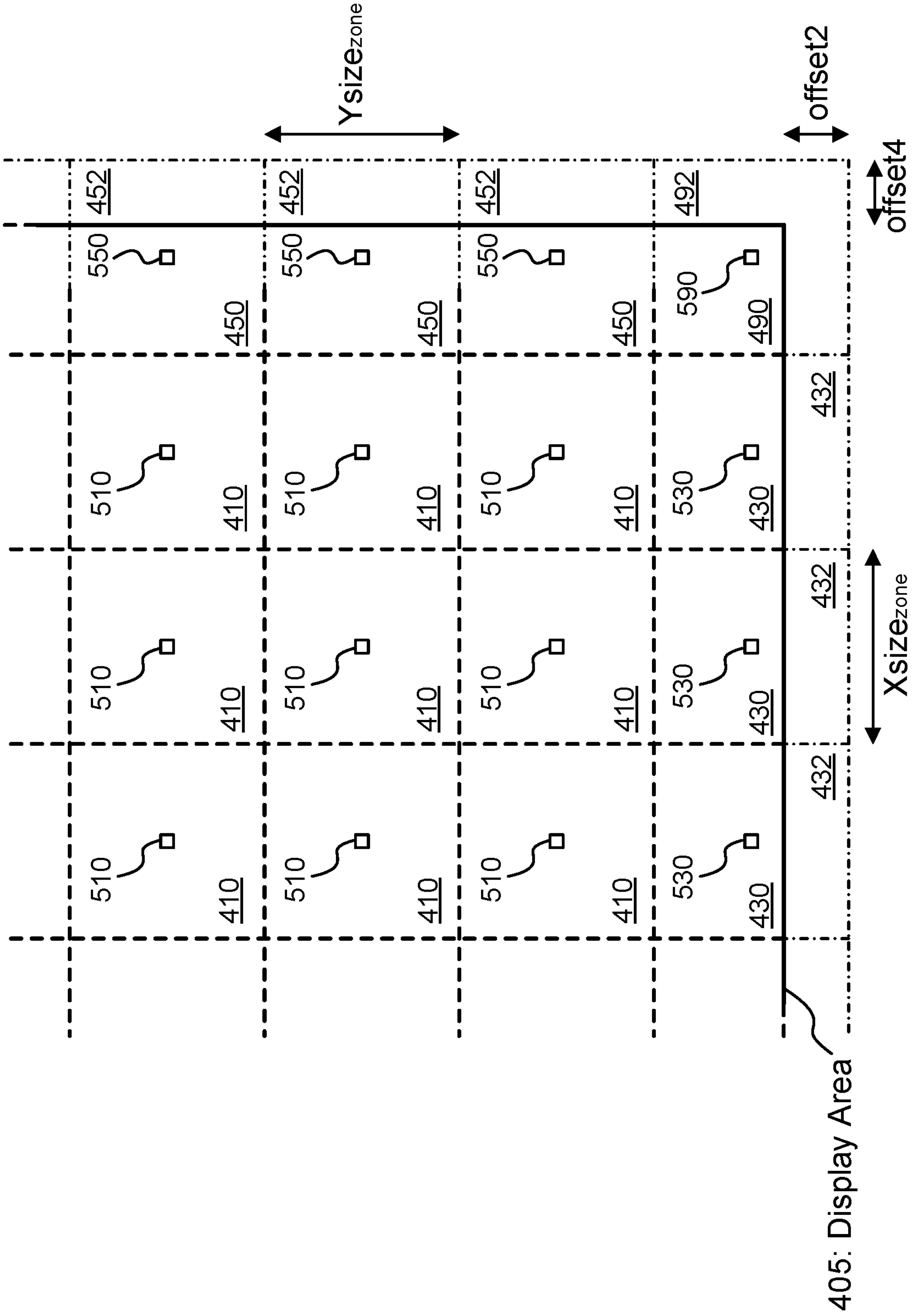
FIG. 7D shows an enlarged view of the right bottom corner of the display area, according to one or more embodiments.

FIG. 7D shows an enlarged view of the right bottom corner of the display area 405, according to one or more embodiments. The right bottom corner zone 490 is defined in a manner similar to the right top corner zones 470 shown in FIG. 7B. More specifically, the right bottom corner zones 490 is defined as the overlapping area of the right bottom corner extended zone 492 and the display area 405, wherein the right bottom corner extended zone 492 has the same size and shape as the inner zone 410 diagonally adjacent to the right bottom corner zone 490, and the right bottom corner outmost light source 590 is located at the center of the right bottom corner extended zone 492.

Figure 8:
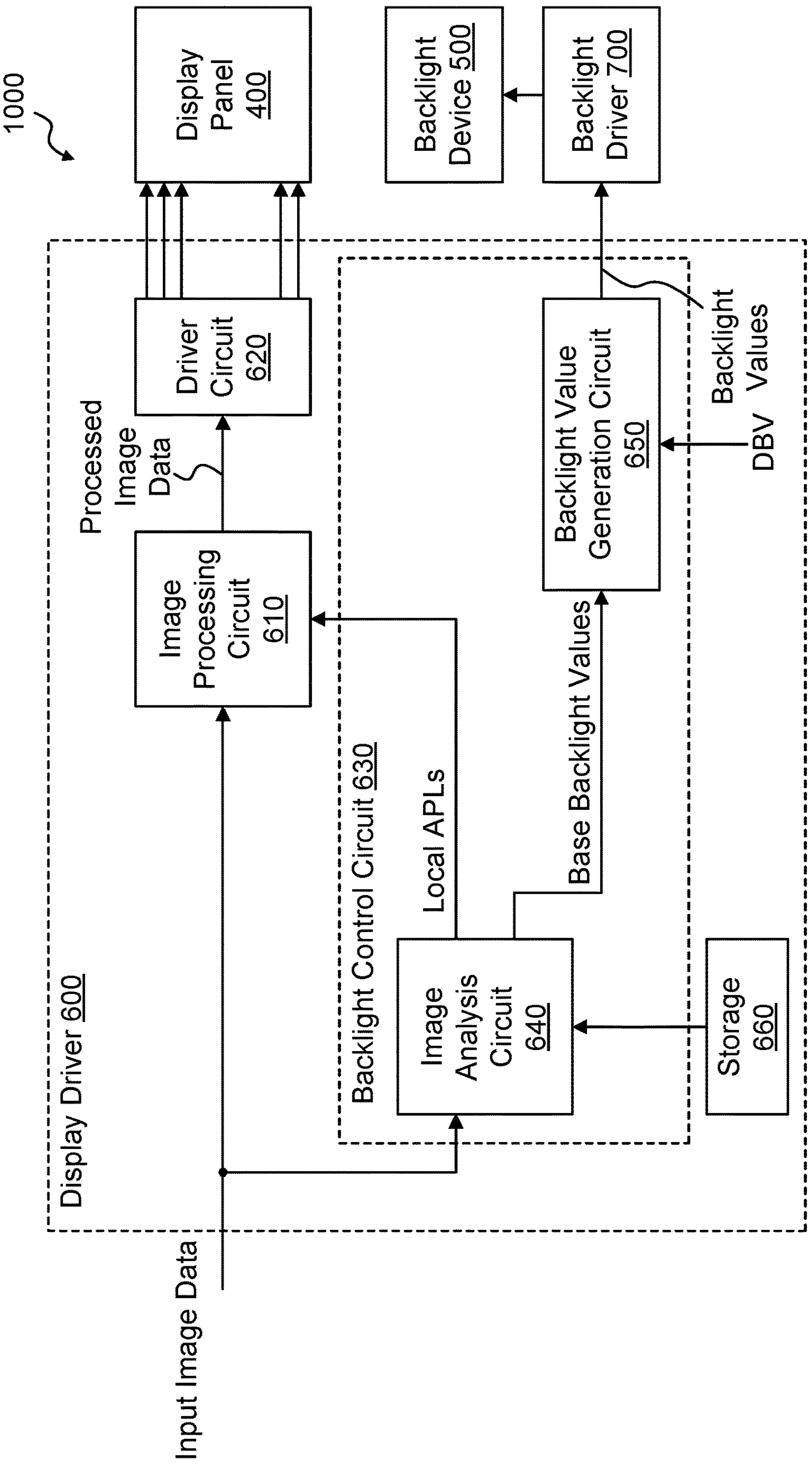
FIG. 8 shows an example configuration of a display driver, according to one or more embodiments.

FIG. 8 shows an example configuration of the display driver 600, according to one or more embodiments. In the shown embodiment, the display driver 600 includes an image processing circuit 610, a driver circuit 620, a backlight control circuit 630, and a storage 660. The display driver 600 is configured to receive input image data corresponding to the display image. In one implementation, each pixel of the display panel 400 may include red (R), green (G), and blue (B) subpixels configured to display red, green, and blue colors, respectively, and the input image data may include R, G, and B graylevels for each pixel, wherein the R, G, and B graylevels specify the luminance levels of the R, G, and B subpixels, respectively.

The image processing circuit 610 is configured to perform image processing on the input image data to produce processed image data. The image processing performed by the image processing circuit 610 may include color adjustment, demura correction, deburn correction, image scaling, gamma transformation, or other image processing.

The driver circuit 620 is configured to receive the processed image data from the image processing circuit 610 and drive respective pixels of the display panel 400 based at least in part on the processed image data. In one implementation, each pixel of the display panel 400 may include R, G, and B subpixels and the processed image data may include the graylevels of the R, G, and B subpixels for each pixel. The driver circuit 620 may be configured to drive or update the R, G, and B subpixels of each pixel based at least in part on the processed image data to control the luminance levels of the R, G, and B subpixels as specified by the processed image data.

The backlight control circuit 630 is configured to generate backlight values for the respective light sources 505 based at least in part on the input image data and to provide the backlight values to the backlight driver 700 to control the luminance levels of the respective light sources 505 (shown in FIGS. 5 and 6) of the backlight device 500. The backlight values for the light sources 505 may indicate specified luminance levels of the respective light sources 505. The backlight driver 700 is configured to drive the respective light sources 505 based on the backlight values to cause the respective light sources 505 to emit light with the specified luminance levels. The backlight values are generated by the local dimming function based on the input image data. As discussed in detail later, the local dimming function is achieved using the inner zones 410 and the outmost zones 420, 430, 440, 450, 460, 470, 480, and 490 shown in FIGS. 6 and 7A to 7D.

In the shown embodiments, the backlight control circuit 630 includes an image analysis circuit 640 and a backlight value generation circuit 650. The image analysis circuit 640 is configured to analyze the input image data and to generate local average picture levels (APLs) of the respective zones (including the inner zones 410 and the outmost zones 420, 430, 440, 450, 460, 470, 480, and 490) based on the input image data. The local APL of a zone may be a value representing the luminance of the image displayed in the zone and in its adjacent part of the display area 405. In some implementations, the local APLs of the respective zones may be provided to the image processing circuit 610, and image processing may be applied to the input image data depending on the local APLs. The image analysis circuit 640 is further configured to generate the base backlight values based on the result of the analysis of the input image data. The backlight value generation circuit 650 is configured to generate the backlight values for the respective light sources 505 by modifying the base backlight values based on a display brightness value (DBV). The DBV referred to herein is a value that specifies a desired display brightness level of the display device 1000, wherein the display brightness level referred to herein is the overall brightness level of the display image displayed on the display panel 400. The DBV may be generated by an external controller based on a user operation. For example, when a command to adjust the display brightness level of the display device 1000 is manually entered into an input device, the DBV may be generated based on that command. In one implementation, the backlight value generation circuit 650 may be configured to generate the backlight values for the respective light sources 505 by multiplying the base backlight values by a multiplication factor determined based on the DBV.

Figure 9:
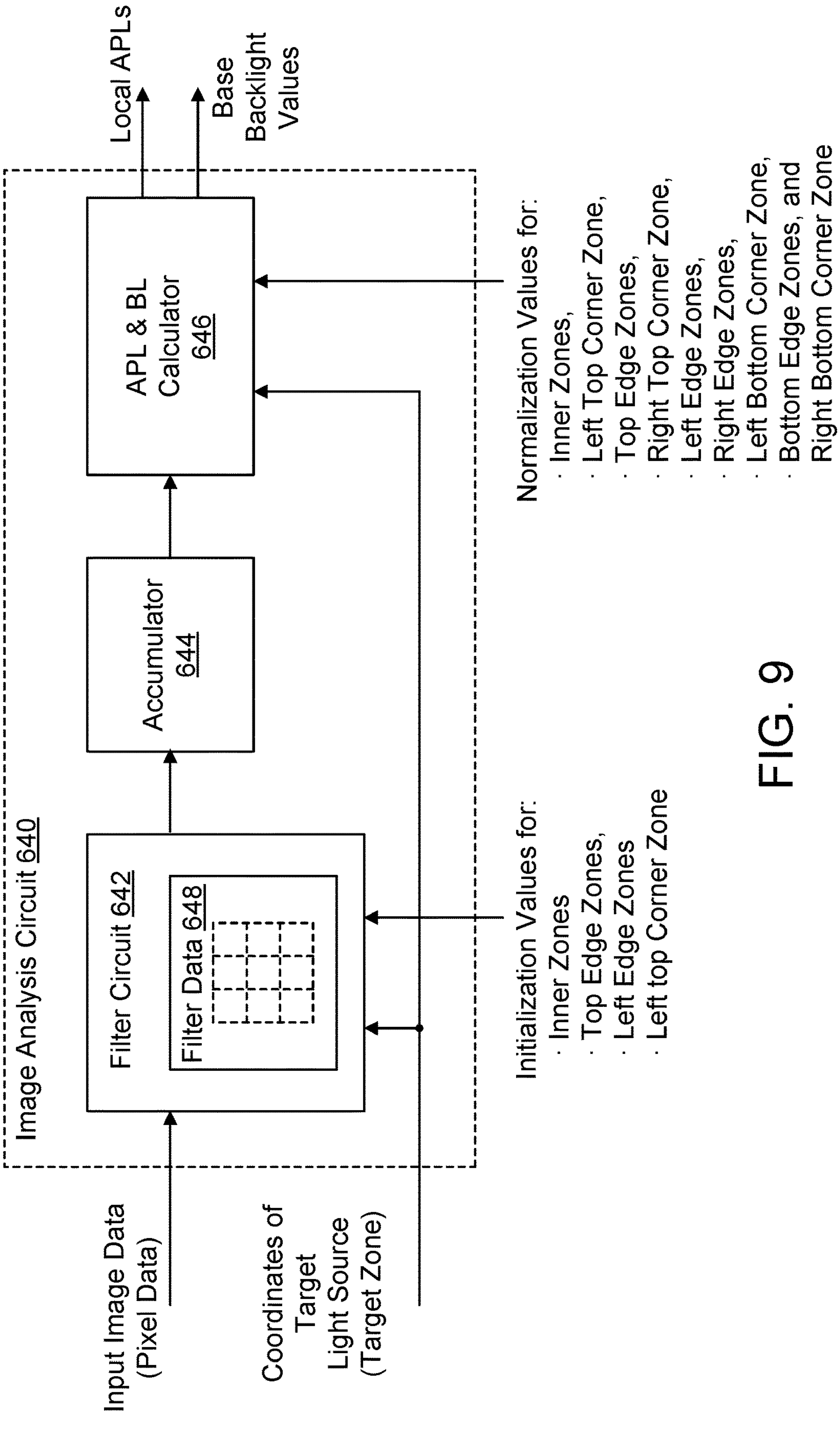
FIG. 9 shows an example configuration of an image analysis circuit, according to one or more embodiments.

FIG. 9 shows an example configuration of the image analysis circuit 640, according to one or more embodiments. In the shown embodiment, the image analysis circuit 640 is configured to receive coordinates of a target light source, which is a light source for which the base backlight value is currently being calculated. The corresponding zone of the target light source may also be referred to as the target zone. The image analysis circuit 640 is configured to calculate, in response to receiving the coordinates of a target light source, the base backlight value of the target light source and the local APL of the target zone. In the shown embodiment, the image analysis circuit 640 includes a filter circuit 642, an accumulator circuit 644, and an APL and backlight value (BL) calculator circuit 646.

The filter circuit 642 is configured to extract pixel data used to calculate the base backlight value of the target light source and the local APL of the target zone, and to apply filtering to the pixel data to produce filtered pixel data. Here, the pixel data of a pixel is indicative of the luminance level of that pixel which may be calculated from the R, G, and B graylevels of that pixel. The filtered pixel data is provided to the accumulator circuit 644.

Figure 10:
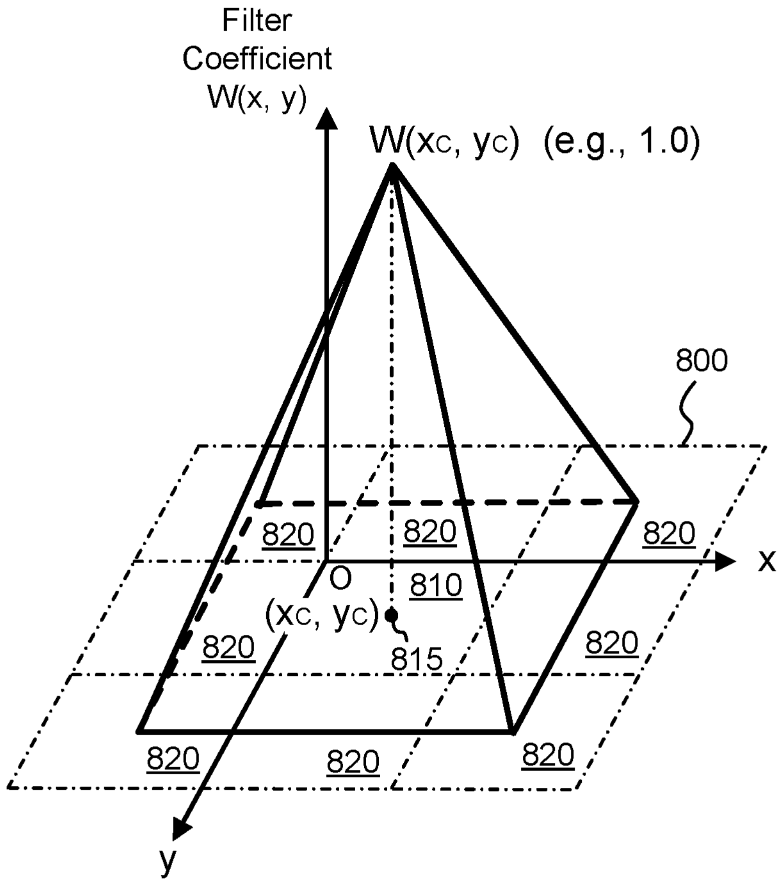
FIG. 10 shows an example definition of filter coefficients, according to one or more embodiments.

FIG. 10 shows an example definition of filter coefficients used for the filtering, according to one or more embodiments. In calculating the base backlight value of the target light source (which is located at the center of the target zone) and the local APL of the target zone, the filtering is applied to pixel data of pixels located in the target zone and its eight adjacent zones, which are arranged in three rows and three columns. In FIG. 10, numeral 800 denotes the 3×3 zones relevant to the filtering for the target zone, numeral 810 denotes the target zone, numeral 815 denotes the center of the target zone 810, and numerals 820 denote its adjacent zones of the target zone 810. In the shown example, the xy coordinates of the pixel positioned at the center 815 of the target zone 810 are $(x_C, y_C)$, and the filter coefficient for the pixel positioned at the center 815 of the target zone 810 is $W(x_C, y_C)$ (e.g., 1.0), which is the maximum filter coefficient. The filter coefficients defined for other pixels in the target zone 810 and its adjacent zones 820 increase as the respective distances between the pixels and the center 815 of the target zone 810 decrease. Although FIG. 10 shows all of the target zone and its eight adjacent zones are inner zones, it should be noted that some of the target zone 810 and its adjacent zones 820 may be extended zones (shown in FIGS. 6 and 7A to 7D). Details of the calculation of the filter coefficients in such cases will be described later.

Referring back to FIG. 9, the filter circuit 642 is configured to store filter data 648 used to generate the filter coefficients assigned to the pixels in the target zone and its adjacent zones through arithmetic processing. Because there may be a large number of pixels in the target zone and its adjacent zones, it may be impractical to store the original filter coefficients assigned to the pixels in the target zone and its adjacent zones. To address this, the filter circuit 642 may be configured to store the filter data 648 and to generate the filter coefficients for the respective pixels in the target zone and its adjacent zones from the filter data 648. The filter data 648 may contain information sufficient to reproduce the filter coefficients. In some implementations, the filter data 648 may include filter coefficients assigned to predetermined ones (but not all) of the pixels in the target zone and its adjacent zones, and the filter circuit 642 may be configured to calculate filter coefficients assigned to the remaining pixels by interpolating the filter coefficients assigned to the predetermined pixels. In other implementations, the filter data 648 may be configured to store the filter coefficients themselves assigned to the pixels in the target zone and its adjacent zones.

Figure 11A:
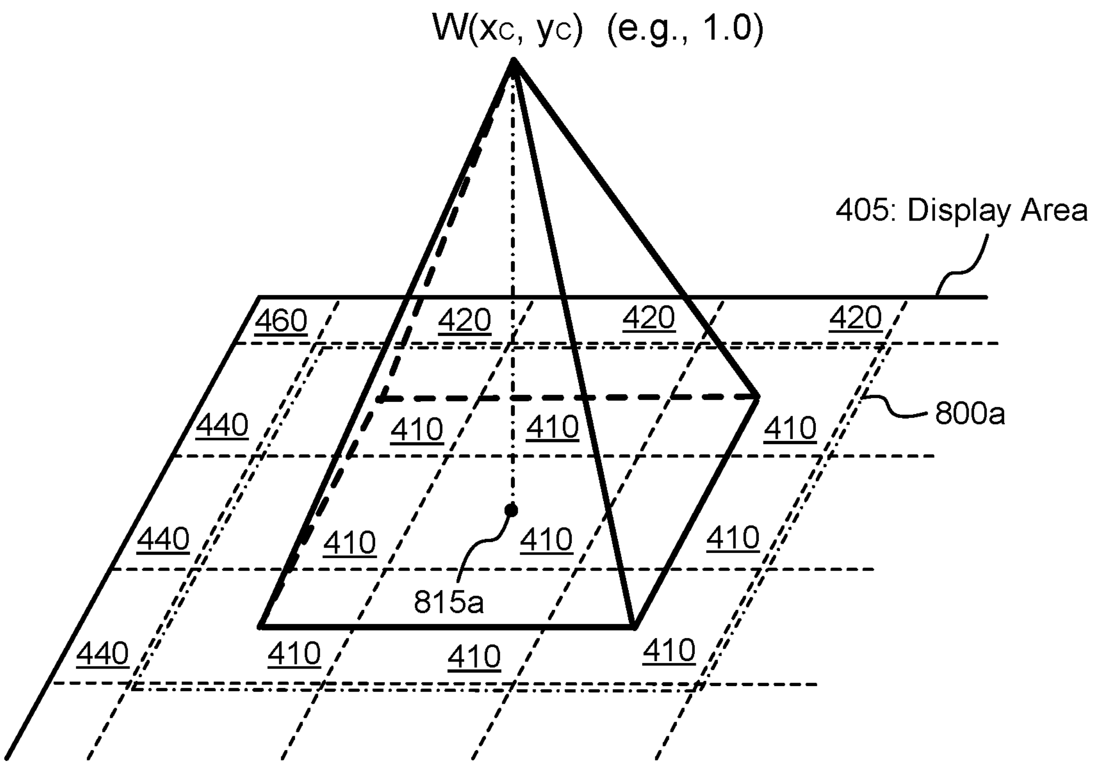
FIG. 11A shows an example definition of filter coefficients for the case where all of a target zone and its adjacent zones are inner zones, according to one or more embodiments.
Figure 11B:
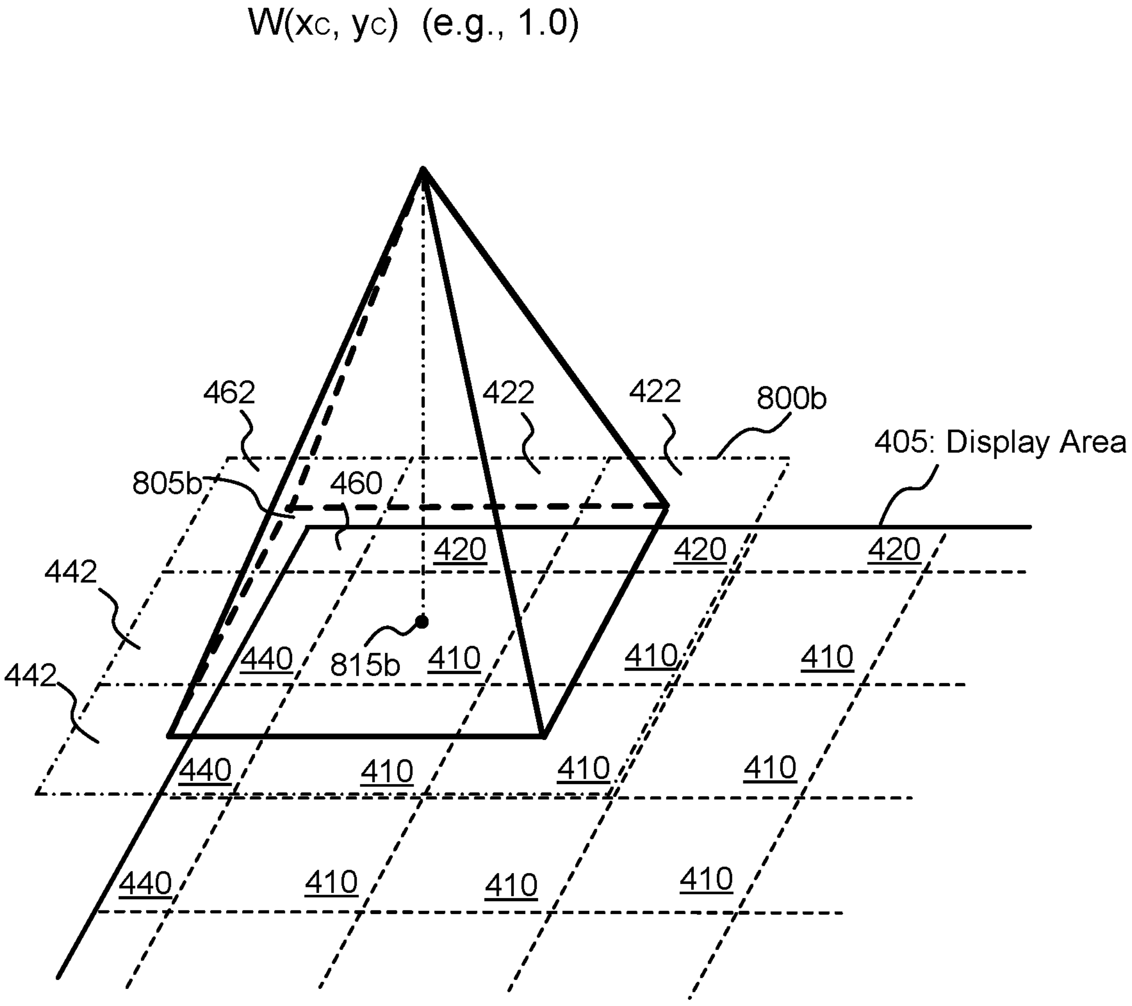
FIG. 11B shows an example definition of filter coefficients for the case where a target zone and its adjacent zones include both inner zones and extended zones, according to one or more embodiments.
Figure 11C:
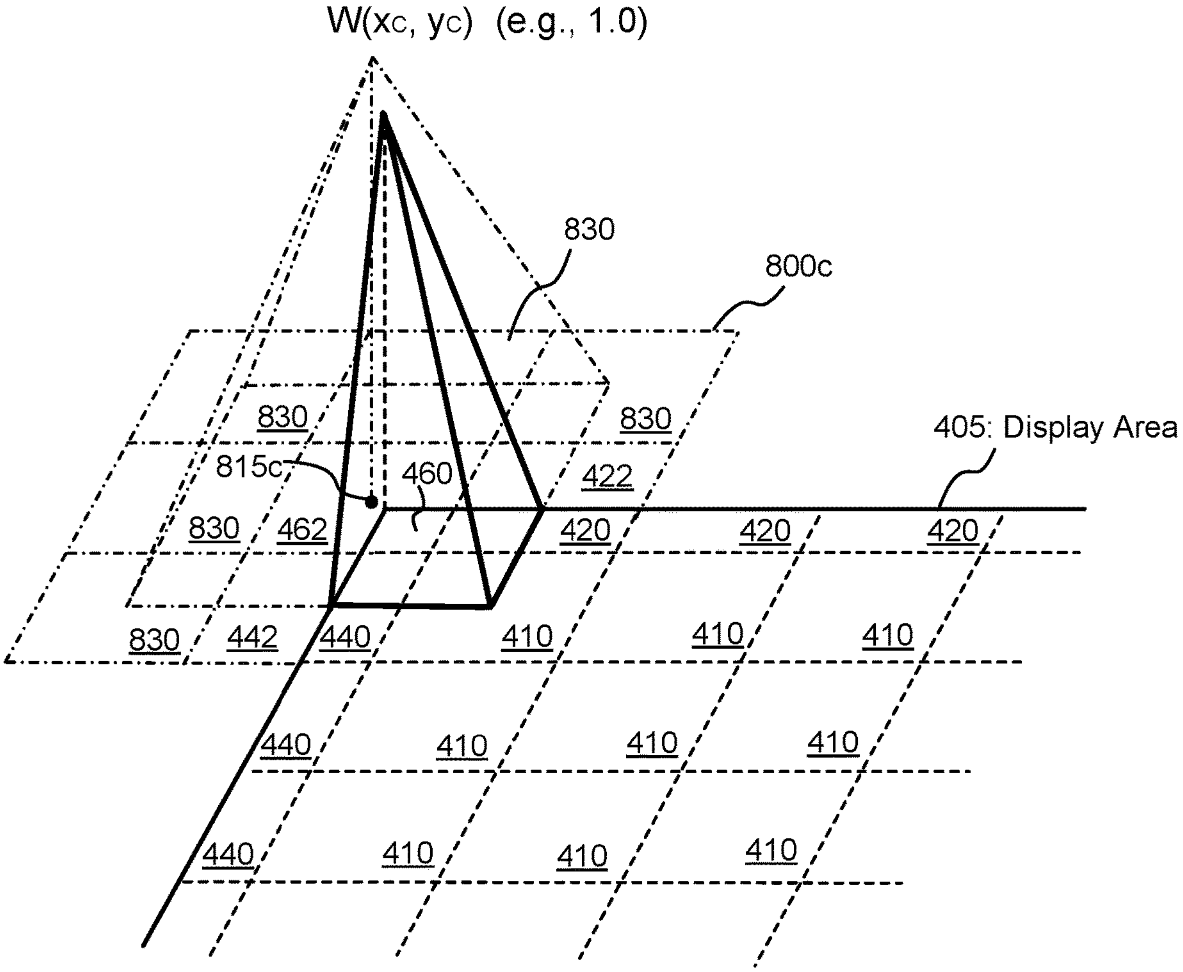
FIG. 11C shows an example definition of filter coefficients for the case where a target zone is the left top corner zone, according to one or more embodiments.

In connection with the fact that the target zone and its adjacent zones are arranged in three rows and three columns, there may be cases where all of the target zone 810 and its adjacent zones 820 are inner zones, and cases where some of the target zone 810 and its adjacent zones 820 are extended zones (shown in FIGS. 6 and 7A to 7D). FIGS. 11A to 11C show examples of the target zone and its adjacent zones, according to one or more embodiments.

FIG. 11A shows an example definition of filter coefficients for the case where all of the target zone and its adjacent zones are inner zones 410, according to one or more embodiments, wherein the numeral 800*a* denotes the 3×3 zones relevant to the filtering for the target zone, numeral 815*a* denotes the center of the target zone. When the 3×3 zones 800*a* are all inner zones 410, the filter coefficients are calculated for all the pixels in the 3×3 zones 800*a* using the filter data 648.

FIG. 11B shows an example definition of filter coefficients for the case where the target zone and its adjacent zones include both of inner zones and extended zones, according to one or more embodiments. In FIG. 11B, the numeral 800*b* denotes the 3×3 zones relevant to filtering for the target zone, numeral 815*b* denotes the center of the target zone. In the shown example, the 3×3 zones 800*b* include four inner zones 410 and five extended zones 422, 442, and 462, wherein the two extended zones 422 are used to define the two top edge zones 420, the two extended zones 442 are used to define the two left edge zones 440, and the extended zone 462 is used to define the left top corner zone 460. In this case, the filter coefficients are calculated for the pixels located in the portion of the display area 405 within the 3×3 zones 800*b*. It should be noted that there are no pixels outside the display area 405.

The filter coefficients for the pixels of the four inner zones 410, the two top edge zones 420, the two left edge zones 440, and the left top corner zone 460 are calculated to be equal to the filter coefficients calculated for the corresponding pixels of the 3×3 zones 800 shown in FIG. 10, which are all inner zones. For example, the filter coefficients for the pixels of the left top corner zone 460, which is the right bottom portion of the zone located at the left top of the 3×3 zones 800*b*, are calculated to be equal to the filter coefficients for the corresponding pixels of the right bottom part of the zone located at the left top of the 3×3 inner zones 800 shown in FIG. 10.

When the target zone is one of the outmost zones, some of the 3×3 zones relevant to the filtering may be "dummy" zones in which there are no pixels. FIG. 11C shows an example definition of filter coefficients for the case where the target zone is the left top corner zone 460, according to one or more embodiments. In FIG. 11C, the numeral 800*c* denotes the 3×3 zones relevant to the filtering for the target zone, numeral 815*c* denotes the center of the extended zone used to define the target zone. In the shown example, the 3×3 zones 800*c* relevant to the filtering include five "dummy" zones 830, one inner zone 410, one top edge zone 420, one left edge zones 440, and one left top corner zone 460. In this case, similarly to the case shown in FIG. 11B, the filter coefficients for the pixels in the inner zone 410, the top edge zones 420, the left edge zone 440, and the left top corner zone 460 are calculated to be equal to the filter coefficients calculated for the corresponding pixels of the 3×3 zones 800 shown in FIG. 10. For example, the filter coefficients for the pixels of the left top corner zone 460, which is the right bottom portion of the target zone, are calculated to be equal to the filter coefficients for the corresponding pixels of the right bottom part of the zone located at the center of the 3×3 zones 800.

FIGS. 12A, 12B, 12C, and 12D show examples of the "starting points" of the respective zones, including inner zones and outmost zones, according to one or more embodiments. The "starting point" of a zone referred here is the pixel position of that zone at which the calculation of the filter coefficients for the pixels of that zone is to be started. In the shown embodiments, the "starting point" of the zone is defined at the left top corner of that zone, and the order of the calculation of the filter coefficients for the pixels of each zone is from left to right and from top to bottom, which is in accordance with a typical circuit operation.

In FIGS. 12A, 12B, 12C, and 12D, numerals 414 indicate the starting points of the inner zones 410. The starting points 414 of the inner zones 410 are at the left top corners of the respective inner zones 410. The filter circuit 642 (shown in FIG. 9) is configured to successively calculate the filter coefficients of the respective pixels in the inner zones 410 based on the positions of the starting points of the inner zones 410.

Figure 12A:
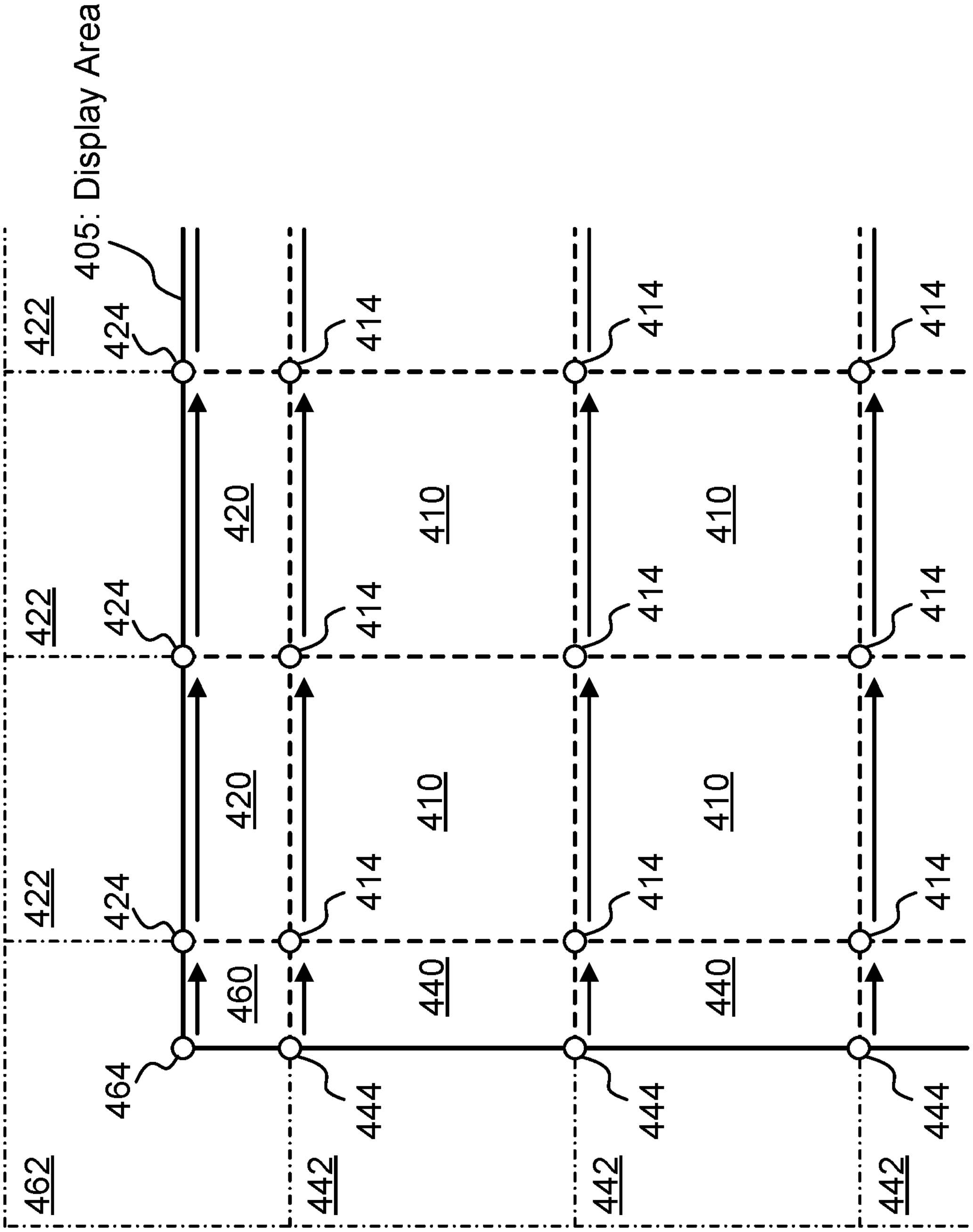
FIGS. 12A 12B, 12C, and 12D show examples of starting points of respective zones, according to one or more embodiments.
Figure 12B:
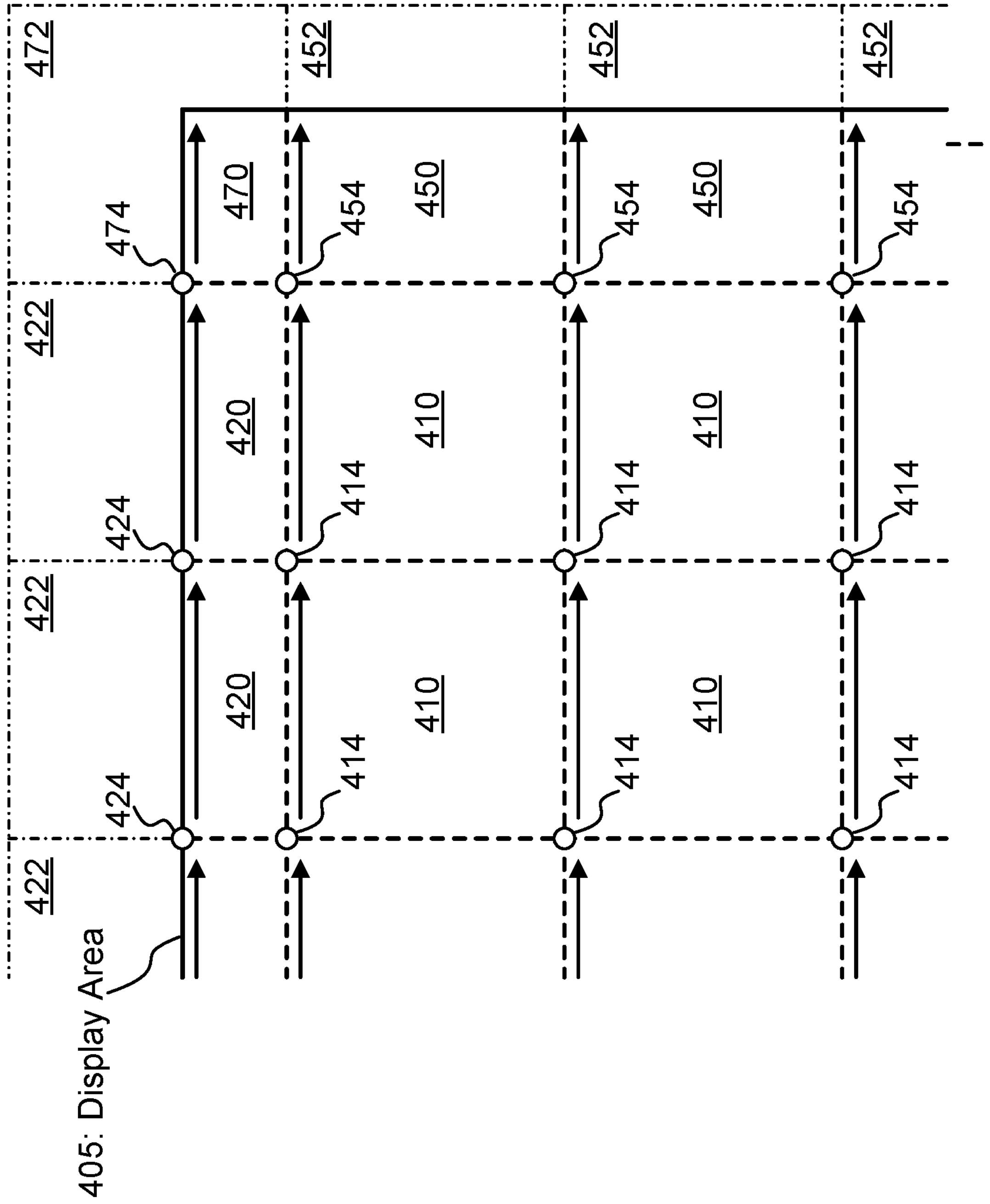
Figure 12C:
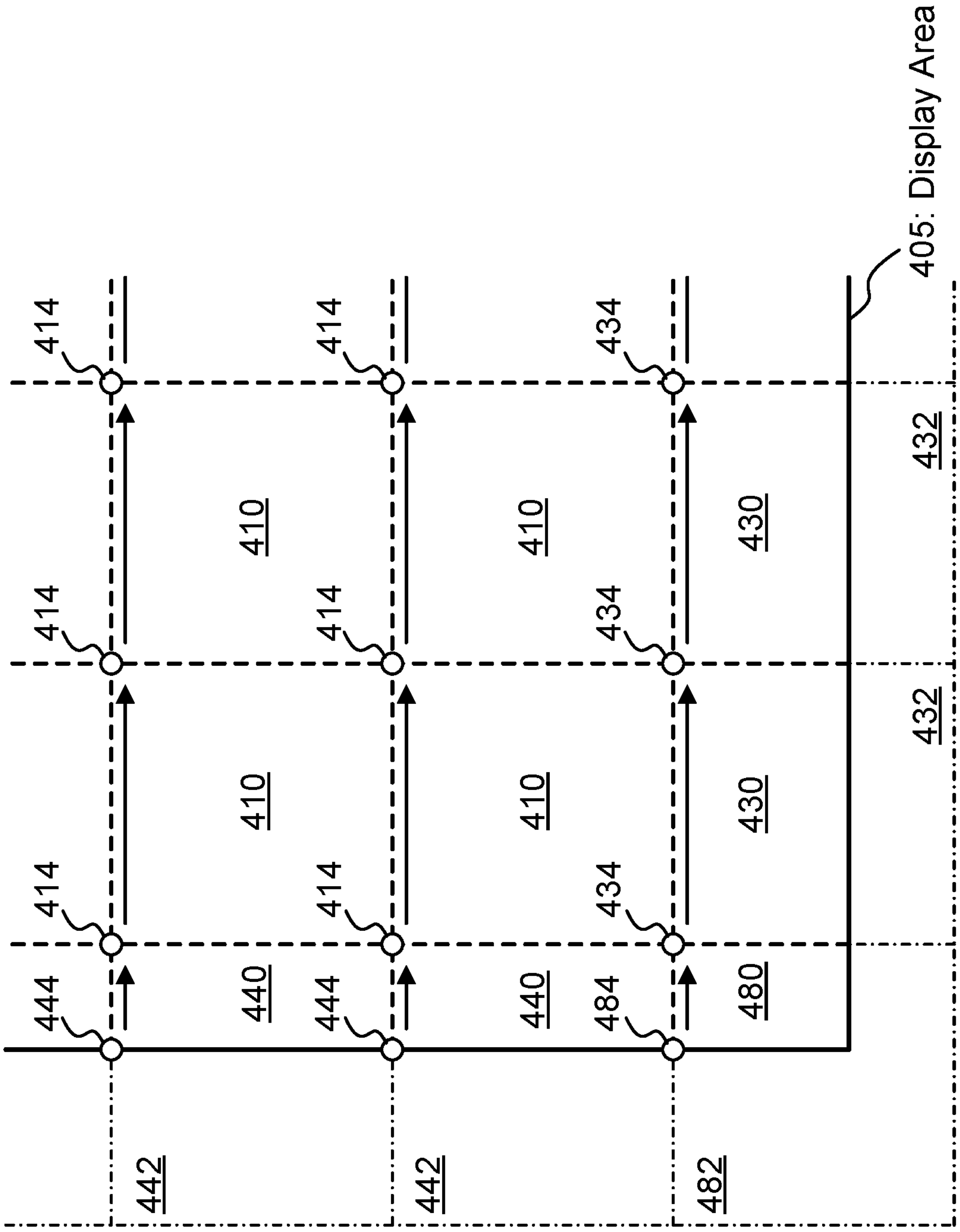
Figure 12D:
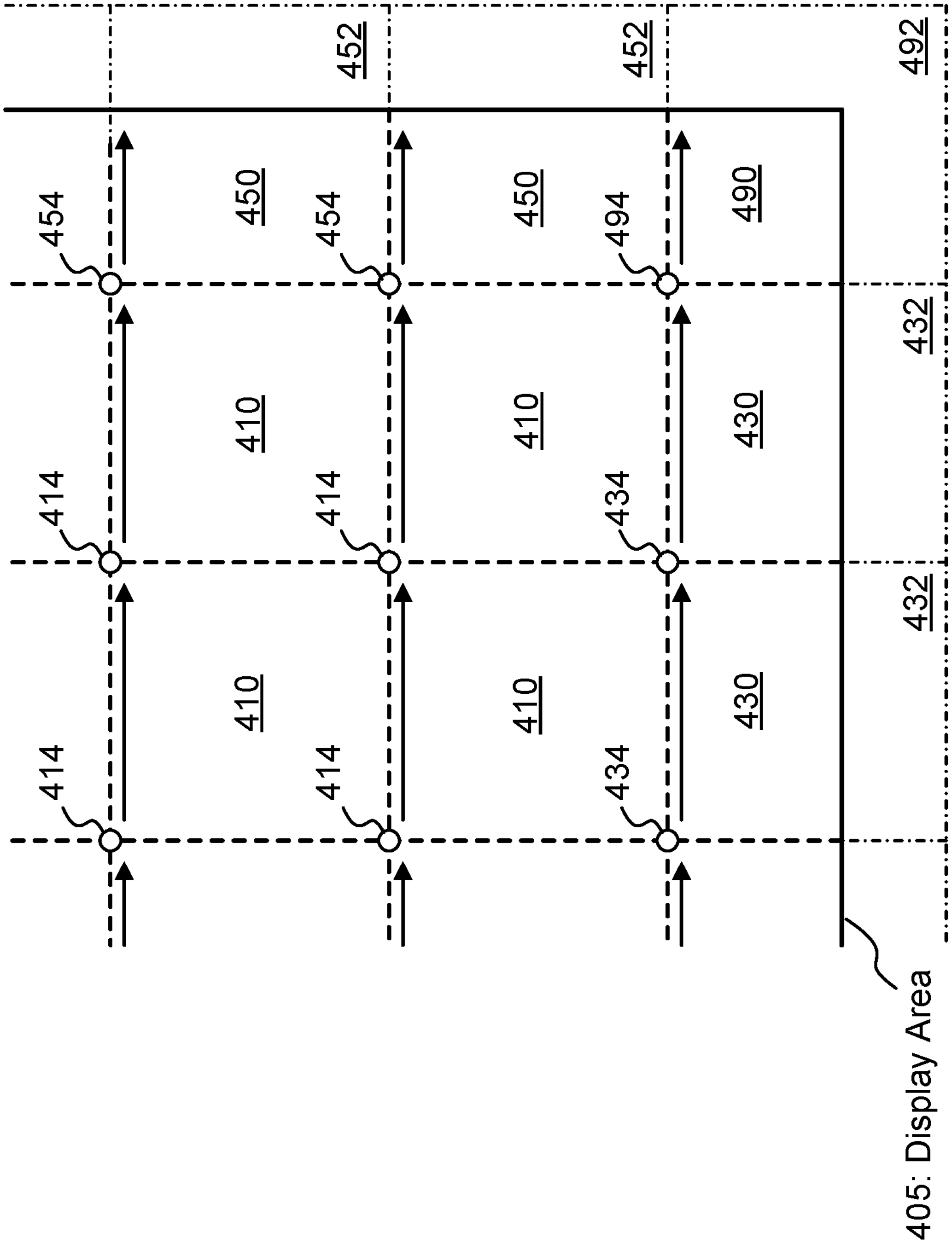

Further, numerals 424, 444, and 464 in FIG. 12A indicate the starting points of the outmost zones 420, 440, and 460, respectively, and numerals 454 and 474 in FIG. 12B indicate the starting points of the outmost zones 450 and 470. Further, numerals 434 and 484 in FIG. 12C indicate the starting points of the outmost zones 430 and 480, and numeral 494 in FIG. 12D indicates the starting point of the outmost zone 490. The starting points 424, 434, 444, 454, 464, 474, 484, and 494 of the outmost zones 420, 430, 440, 450, 460, 470, 480, and 490 are at the left top corners of the respective outmost zones 420, 430, 440, 450, 460, 470, 480, and 490. The filter circuit 642 (shown in FIG. 9) is configured to successively calculate the filter coefficients of the respective pixels in the outmost zones 420, 430, 440, 450, 460, 470, 480, and 490 based on the positions of the starting points of the outmost zones 420, 430, 440, 450, 460, 470, 480, and 490.

The position of the starting point of an outmost zone in the extended zone defining that outmost zone indicates which of the filter coefficients shown in FIG. 10 are to be used for the filtering of the pixel data of the pixels of that outmost zone. For example, the position of the starting point 464 of the left top corner zone 460 in the extended zone 462 indicates which of the filter coefficients shown in FIG. 10 are to be used for the filtering of the pixel data of the pixels of the left top corner zone 460 (see also FIGS. 11B and 11C). The position of the starting point 464 of the left top corner zone 460 in the extended zone 462 may correspond to the offset "offset1" and the offset "offset3" shown in FIG. 7A. A similar goes for the starting points of other outmost zones 420, 430, 440, 450, 470, 480, and 490 in connection with the offsets "offset1" and "offset3" shown in FIGS. 7A to 7D.

In one implementation, the filter circuit 642 may be configured to calculate the filter coefficients for the pixels of each outmost zone based on the position of the starting point of that outmost zone in the extended zone defining that outmost zone. For example, the filter circuit 642 may be configured to calculate the filter coefficients for the pixels of the left top corner zone 460 based on the position of the starting point 464 of the left top corner zone 460 in the extended zone 462.

Referring back to FIG. 9, the filter circuit 642 is configured to receive initialization values that correspond to the positions of the starting points 414, 424, 444, and 464 of the inner zones 410, the top edge zones 420, the left edge zones 440, and the left top corner zone 460, and to calculate the filter coefficients for the pixels of the respective zones (including the inner zones and the outmost zones). In one implementation, the storage 660 shown in FIG. 8 may be configured to store the initialization values to provide the initialization values to the filter circuit 642. It should be noted that the positions of the starting points of the inner zones 410, the top edge zones 420, the left edge zones 440, and the left top corner zone 460 contain sufficient information to calculate the filter coefficients of the pixels in all the zones, including the inner zones and the outmost zones. This is because:

(a) the position of the starting point 474 of the right top corner zone 470 in the extended zone 472 is equivalent to the position in the starting point 424 of the top edge zone 420 in the extended zone 422 (see FIG. 12B), (b) the position of the starting point 484 of the left bottom corner zone 480 in the extended zone 482 is equivalent to the position in the starting point 444 of the left edge zone 440 in the extended zone 442 (see FIG. 12C), (c) the positions of the starting points 434, 454, and 494 of the bottom edge zones 430, 450 and 490 are at the left top corners of the extended zones 432, 452, and 492 (see FIGS. 12B, 12C, and 12D), respectively, and (d) the end-of-data of pixel data of each pixel row, the end-of-data of pixel data of each pixel column, and the end-of-data of pixel data of each outmost zone indicate the end of the calculation of the filter coefficients for each pixel row, each pixel column, and each outmost zone, respectively.

The filter circuit 642 is further configured to apply the filter coefficients to the pixel data of the respective zones, thereby producing filtered pixel data. The filter circuit 642 is further configured to provide the filtered pixel data to the accumulator circuit 644.

The accumulator circuit 644 is configured to accumulate, for each zone, values of filtered pixel data of the 3×3 zones that include that zone and its adjacent eight zones to calculate a filtered sum for each zone. The filtered sum for each zone is the sum of the values of the filtered pixel data of the pixels of the 3×3 zones that includes that zone and its eight adjacent zones. In one implementation, the filtered sum for a target zone, which may be an inner zone or an outmost zone, may be calculated according to the following expression (1):

$$\mathrm{SUM} = \sum_i w(i) \cdot pix(i), \tag{1}$$

where SUM is the filtered sum for the target zone, Σ represents the sum for the pixels in the target zone and its eight adjacent zones, w (i) is the filter coefficient for pixel i, and pix (i) is the value of the pixel data of pixel i.

The following is a detailed description of the calculation of the filtered sum for a target zone with zone indices ($X_{LS}$, $Y_{LS}$). Here $X_{LS}$ is an X index that indicates the horizontal location in the array of the zones, and is an integer between 0 and M−1, inclusive, where M is the number of the columns of the zones of the display area 405. The target zone with an X index of $X_{LS}$ is located in the ($X_{LS}$+1)-th column of the zone array from the left. $Y_{LS}$ is a Y index that indicates the vertical location in the array of the zones, and is an integer between 0 and N−1, inclusive, where N is the number of the rows of the zones of the display area 405. The target zone with a Y index of $Y_{LS}$ is located in the ($Y_{LS}$+1)-th row of the array of the zones from the top. The notations used in the following description are as follows.

(x, y) are xy coordinates in the xy coordinate system defined for the filter shown in FIG. 10 and w (x, y) is the filter coefficient for a pixel with coordinates (x, y), which are defined in the xy coordinate system shown in FIG. 10. It should be noted that the origin O of the xy coordinate system is at the left top corner of the target zone. (X, Y) are XY coordinates in the coordinate system defined for the display area 405 of the display panel 400 as shown in FIG. 6.

$xsize_{filter}$ is the horizontal size of the 3×3 zones that contains the target zone and its adjacent zones, and $ysize_{filter}$ is the vertical size of the 3×3 zones. The horizonal size $xsize_{filter}$ and the vertical size $ysize_{filter}$ are expressed using the horizontal and vertical sizes $Xsize_{zone}$ and $Ysize_{zone}$ of the inner zones and the extended zones (see FIG. 7A) as follows:

$$xsize_{filter} = 3 \times Xsize_{zone},$$

and $$ysize_{filter} = 3 \times Ysize_{zone}.$$

$X_{filter}$ and $Y_{filter}$ are the xy coordinates of the left top corner of the 3×3 zones that contains the target zone and its adjacent zones, in the coordinate system shown in FIG. 10. $X_{filter}$ and Y filter are expressed using $xsize_{filter}$ and $ysize_{filter}$ as follows:

$$(X_{filter}, Y_{filter}) = (-xsize_{filter}/3, \ -ysize_{filter}/3).$$

When the target zone is one of the inner zones 410 with zone indices ($X_{LS}$, $Y_{LS}$), the filtered sum SUM ($X_{LS}$, $Y_{LS}$) is calculated in accordance with the following expression (2):

$$\mathrm{SUM}(X_{LS}, Y_{LS}) = \sum_{y=Y_{filter}}^{Y_{filter}+ysize_{filter}} \ \sum_{x=X_{filter}}^{X_{filter}+xsize_{filter}} w(x, y) \cdot pix(X_{pix} + x, Y_{pix} + y), \tag{2}$$

where $X_{pix}$ and $Y_{pix}$ are XY coordinates of the left top corner of the target zone, w (x, y) is the filter coefficient for a pixel with coordinates (x, y), and pix (X, Y) is the value of pixel data of the pixel with XY coordinates (X, Y).

When the target zone is the left top corner zone 460, which has zone indices (0, 0), the filtered sum SUM (0, 0) is calculated in accordance with the following expression (3):

$$\mathrm{SUM}(0, 0) = \sum_{y=offset1}^{Y_{filter}+ysize_{filter}} \ \sum_{x=offset3}^{X_{filter}+xsize_{filter}} w(x, y) \cdot pix(X_{pix} + x, Y_{pix} + y), \tag{3}$$

where, as shown in FIG. 7A, "offset1" is the offset in the vertical direction between the top edge of the display area 405 and the top edges of the extended zones 422 and 462, and "offset3" is the offset in the horizontal direction between the left edge of the display area 405 and the left edges of the extended zones 442 and 462.

When the target zone is one of the top edge zones 420 with zone indices ($X_{LS}$, 0), the filtered sum SUM ($X_{LS}$, 0) is calculated in accordance with the following expression (4):

$$\text{SUM}\,(X_{LS},0)=\sum_{y=offset1}^{Y_{filter}+ysize_{filter}}\;\sum_{x=X_{filter}}^{X_{filter}+xsize_{filter}} w(x,y)\cdot pix(X_{pix}+x,\,Y_{pix}+y). \tag{4}$$

When the target zone is the right top corner zone 470, which has zone indices (N−1, 0), the filtered sum SUM (N−1, 0) is calculated in accordance with the following expression (5):

$$\text{SUM}\,(N,1,0)=\sum_{y=offset1}^{Y_{filter}+ysize_{filter}}\;\sum_{x=X_{filter}}^{X_{filter}+xsize_{filter}-offset4} w(x,y)\cdot pix(X_{pix}+x,\,Y_{pix}+y), \tag{5}$$

where "offset4" is the offset in the horizontal direction between the right edge of the display area 405 and the right edges of the extended zones 452 and 472 as shown in FIG. 7B.

When the target zone is one of the left edge zones 440 with zone indices (0, $Y_{LS}$), the filtered sum SUM (0, $Y_{LS}$) is calculated in accordance with the following expression (6):

$$\text{SUM}\,(0,Y_{LS})=\sum_{y=Y_{filter}}^{Y_{filter}+ysize_{filter}}\;\sum_{x=offset3}^{X_{filter}+xsize_{filter}} w(x,y)\cdot pix(X_{pix}+x,\,Y_{pix}+y). \tag{6}$$

When the target zone is one of the right edge zones 450 with zone indices (N−1, $Y_{LS}$), the filtered sum SUM (N−1, $Y_{LS}$) is calculated in accordance with the following expression (7):

$$\text{SUM}\,(N-1,Y_{LS})=\sum_{y=Y_{filter}}^{Y_{filter}+ysize_{filter}}\;\sum_{x=X_{filter}}^{X_{filter}+xsize_{filter}-offset4} w(x,y)\cdot pix(X_{pix}+x,\,Y_{pix}+y). \tag{7}$$

When the target zone is the left bottom corner zone 480, which has zone indices (0, M−1), the filtered sum SUM (0, M−1) is calculated in accordance with the following expression (8):

$$\text{SUM}\,(0,M-1)=\sum_{y=Y_{filter}}^{Y_{filter}+ysize_{filter}-offset2}\;\sum_{x=offset3}^{X_{filter}+xsize_{filter}} w(x,y)\cdot pix(X_{pix}+x,\,Y_{pix}+y), \tag{8}$$

where "offset2" is the offset between the bottom edge of the display area 405 and the bottom edges of the extended zones 432 and 482 in the vertical direction as shown in FIG. 7C.

When the target zone is one of the bottom edge zones 430 with zone indices ($X_{LS}$, M−1), the filtered sum SUM ($X_{LS}$, M−1) is calculated in accordance with the following expression (9):

$$\text{SUM}\,(X_{LS},M-1)=\sum_{y=Y_{filter}}^{Y_{filter}+ysize_{filter}-offset2}\;\sum_{x=X_{filter}}^{X_{filter}+xsize_{filter}} w(x,y)\cdot pix(X_{pix}+x,\,Y_{pix}+y). \tag{9}$$

When the target zone is the right bottom corner zone 490, which has the zone indices (N−1, M−1), the filtered sum SUM (N−1, M−1) is calculated in accordance with the following expression (10):

$$\text{SUM}\,(\text{N}-1,M-1)=\sum_{y=Y_{filter}}^{Y_{filter}+ysize_{filter}-offset2}\;\sum_{x=X_{filter}}^{X_{filter}+xsize_{filter}-offset4} w(x,y)\cdot pix(X_{pix}+x,\,Y_{pix}+y). \tag{10}$$

With further reference to FIG. 9, the APL and BL calculator circuit 646 is configured to receive the filtered sum for each zone from the accumulator circuit 644 to calculate a local APL for each zone based on the filtered sum for that zone. As discussed above, the local APL of a zone may be a value representing the luminance of the image displayed in the zone and in its adjacent part of the display area 405. In one implementation, the APL and BL calculator circuit 646 may be configured to calculate the local APL for each zone by normalizing the filtered sum for each zone with a normalization value determined for that zone, e.g., by dividing the filtered sum for each zone by the normalization value determined for that zone. The normalization value for a target zone corresponds to the sum of the filter coefficients for pixels in the target zone and its adjacent zones multiplied by the maximum value of the pixel data. In one implementation, the normalization value for the target zone is the sum of the filter coefficients for pixels in the target zone and its adjacent zones multiplied by the maximum value of the pixel data. In one or more embodiments, the normalization value for a target zone may be represented by the following equation (11):

$$\text{Normalization Value}=\sum_i w(i)\cdot Pix_{max}, \tag{11}$$

where Σ represents the sum for the pixels in the target zone and its adjacent zones, w (i) is the filter coefficient for pixel i in the target zone and its adjacent zones, and $Pix_{max}$ is the maximum value of the pixel data. In implementations where pixel data is 10-bit data, $Pix_{max}$ is 1023.

In one implementation, the APL and BL calculator circuit 646 may be configured to receive normalization values for the inner zones 410, the top edge zones 420, the bottom edge zones 430, the left edge zones 440, the right edge zones 450, the left top corner zone 460, the right top corner zone 470, the left bottom corner zone 480, and the right bottom corner zone 490. The APL and BL calculator circuit 646 may be further configured to select an appropriate one of the received normalization values depending on the type of the target zone and calculate the local APL for the target zone using the selected normalization value. For example, the APL and BL calculator circuit 646 may be configured to, when the target zone is an inner zone 410, select the normalization value of the inner zones 410 and calculate the local APL for the target zone by dividing the filtered sum for the target zone by the selected normalization value. In another example, the APL and BL calculator circuit 646 may be further configured to, when the target zone is a top edge zone 420, select the normalization value of the top edge zones 420 and calculate the local APL for the target zone by dividing the filtered sum for the target zone by the selected normalization value. A similar goes for other types of zones.

The APL and BL calculator circuit 646 is further configured to calculate the base backlight value for each light source 505 based on the local APL of the corresponding zone of that light source 505. In one implementation, the base backlight value for each light source 505 may increase as the local APL of the corresponding zone of that light source 505 increases. The base backlight value calculated for each light source 505 is provided to the backlight value generation circuit 650 (shown in FIG. 8), and used to determine the backlight value for that light source 505 to control the luminance level of that light source 505.

Figure 13:
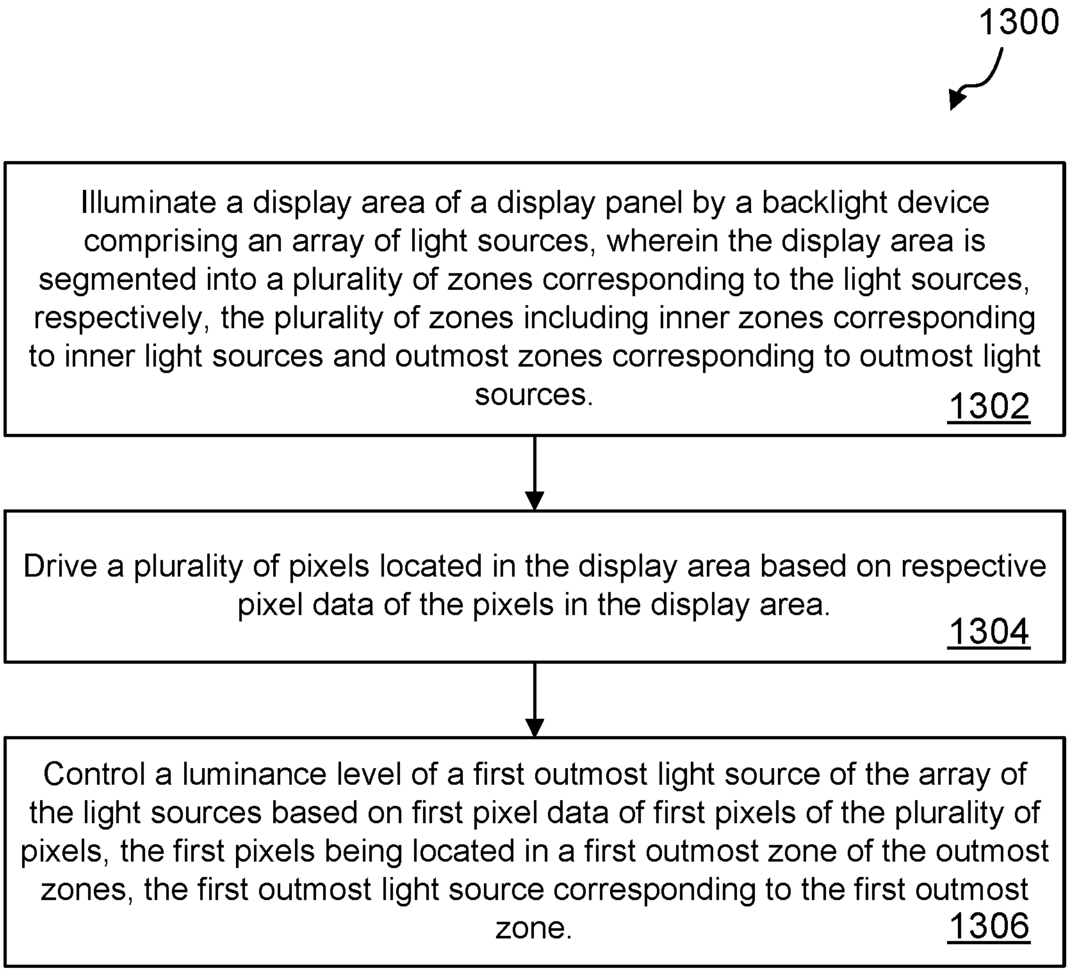
FIG. 13 is a flowchart of an exemplary process for local dimming, according to one or more embodiments.

FIG. 13 is a flowchart of an exemplary process for local dimming, according to one or more embodiments. The process 1300 may be performed by the display device 1000 and in particular, the display driver 600 shown in FIG. 5. However, it will be recognized that a display device that includes additional and/or fewer components as shown in FIG. 5 may be used to perform the process 1300, that any of the following steps may be performed in any suitable order, and that the process 1300 may be performed in any suitable environment.

In step 1302, a backlight device (e.g., the backlight device 500 shown in FIG. 5) including an array of light sources (e.g., the light sources 505) illuminates a display area (e.g. the display area 310 shown in FIG. 4A and the display area 405 shown in FIGS. 6 and 7A to 7D) of a display panel (e.g. the display panel 400). The display area is segmented into a plurality of zones corresponding to the light sources, respectively. The plurality of zones includes inner zones (e.g., the inner zones 312 shown in FIG. 4A and the inner zones 410 shown in FIG. 7A to 7D) corresponding to inner light sources (e.g., the light sources 322 shown in FIG. 4A and the light sources 510 in FIGS. 7A to 7D) of the array of light sources and outmost zones (e.g., the outmost zones 334, 337, and 338 shown in FIG. 4A and the outmost zones 420, 430, 440, 450, 460, 470, 480, and 490) shown in FIGS. 7A to 7D) corresponding to outmost light sources (e.g., the outmost light sources 324, 327, and 328 shown in FIG. 4A and the outmost light sources 520, 530, 540, 550, 560, 570, 580, and 590 shown in FIGS. 7A to 7D) of the array of light sources. The inner zones are located apart from edges of the display area of the display panel, and each of the inner light sources is each located at a center of a respective inner zone. The outmost zones are located along the edges of the display area of the display panel. Each of the outmost zones is different in size or shape from at least one inner zone which is adjacent to at least one outmost zone.

In step 1304, a display driver (e.g., the display driver 600 shown in FIGS. 5 and 8), drives a plurality of pixels located in the display area based on respective pixel data of the pixels in the display area.

In step 1306, the display driver controls a luminance level of a first outmost light source of the array of light sources based on first pixel data of first pixels of the plurality of pixels. The first pixels are located in a first outmost zone of the outmost zones, and the first outmost light source corresponds to the first outmost zone.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A display device, comprising:

a backlight device comprising an array of light sources configured to illuminate a display area of a display panel, wherein the display area is segmented into a plurality of zones corresponding to the light sources, respectively, the plurality of zones comprising:

inner zones corresponding to inner light sources of the array of light sources, wherein the inner zones are located apart from edges of the display area of the display panel, and wherein each of the inner light sources is located at a center of a respective inner zone; and outmost zones located along the edges of the display area of the display panel and corresponding to outmost light sources of the array of light sources, wherein each of the outmost zones is different in size or shape from at least one inner zone which is adjacent to at least one outmost zone;

a driver circuit configured to drive a plurality of pixels in the display area; and a backlight control circuit configured to control a luminance level of a first outmost light source of the array of light sources based on first pixel data of first pixels of the plurality of pixels, the first pixels being located in a first outmost zone of the outmost zones, the first outmost light source corresponding to the first outmost zone;

wherein the first outmost zone is defined to be an overlapping area of an extended zone and the display area of the display panel;

wherein the extended zone is defined such that the extended zone has the same size and shape as a first inner zone of the inner zones and that the first outmost light source is located at the center of the extended zone; and wherein the first inner zone is adjacent to the first outmost zone.

2. The display device of claim 1, wherein the backlight control circuit is further configured to:

receive an initialization value corresponding to a position of a corner of the first outmost zone in the extended zone;

determine, based on the initialization value, filter coefficients for the first pixels located in the first outmost zone; and apply the determined filter coefficients to the first pixel data of the first pixels located in the first outmost zone to generate filtered pixel data of the first pixels, and wherein controlling the luminance level of the first outmost light source is based on the filtered pixel data of the first pixels.

3. The display device of claim 1, wherein controlling the luminance level of the first outmost light source is further based on second pixel data of second pixels of the plurality of pixels, the second pixels being located in adjacent zones of the plurality of zones, the adjacent zones being adjacent to the first outmost zone.

4. The display device of claim 3, wherein the backlight control circuit is further configured to:

receive an initialization value corresponding to a position of a corner of the first outmost zone in the extended zone;

determine, based on the initialization value, filter coefficients for the first pixels located in the first outmost zone and the second pixels located in the adjacent zones; and apply the determined filter coefficients to the first pixel data of the first pixels and the second pixel data of the second pixels to generate filtered pixel data of the first pixels and the second pixels, and wherein controlling the luminance level of the first outmost light source is based on the filtered pixel data of the first pixels and the second pixels.

5. The display device of claim 4, wherein the backlight control circuit is further configured to determine a sum of values of the filtered pixel data of the first pixels and the second pixels, and wherein controlling the luminance level of the first outmost light source is based on the sum of the values of the filtered pixel data.

6. The display device of claim 5, wherein the backlight control circuit is further configured to:

receive a normalization value for the first outmost zone; and calculate a normalized sum by dividing the sum of the values of the filtered pixel data by the normalization value, and wherein controlling the luminance level of the first outmost light source is based on the normalized sum.

7. The display device of claim 6, wherein the normalization value corresponds to a total sum of the filter coefficients determined for the first pixels and the second pixels.

8. The display device of claim 1, wherein each of the plurality of zones is substantially rectangular.

9. The display device of claim 8, wherein a horizontal width of the first outmost zone is different from a horizontal width of the inner zones, and/or a vertical height of the first outmost zone is different from a vertical height of the inner zones.

10. A display driver, comprising:

a driver circuit configured to drive a plurality of pixels located in a display area of a display panel, the display area being illuminated by a backlight device comprising an array of light sources, wherein the display area is segmented into a plurality of zones corresponding to the light sources, respectively, the plurality of zones comprising:

inner zones corresponding to inner light sources of the array of light sources, wherein the inner zones are located apart from edges of the display area of the display panel, and wherein each of the inner light sources is located at a center of a respective inner zone; and outmost zones located along the edges of the display area of the display panel and corresponding to outmost light sources of the array of light sources, wherein each of the outmost zones is different in size or shape from at least one inner zone which is adjacent to at least one outmost zone; and a backlight control circuit configured to control a luminance level of a first outmost light source of the array of light sources based on first pixel data of first pixels of the plurality of pixels, the first pixels being located in a first outmost zone of the outmost zones, the first outmost light source corresponding to the first outmost zone;

wherein the first outmost zone is defined to be an overlapping area of an extended zone and the display area of the display panel;

wherein the extended zone is defined such that the extended zone has the same size and shape as a first inner zone of the inner zones and that the first outmost light source is located at the center of the extended zone; and wherein the first inner zone is adjacent to the first outmost zone.

11. The display driver of claim 10, wherein the backlight control circuit is further configured to:

receive an initialization value corresponding to a position of a corner of the first outmost zone in the extended zone;

determine, based on the initialization value, filter coefficients for the first pixels located in the first outmost zone; and apply the determined filter coefficients to the first pixel data of the first pixels located in the first outmost zone to generate filtered pixel data of the first pixels, and wherein controlling the luminance level of the first outmost light source is based on the filtered pixel data of the first pixels.

12. The display driver of claim 11, further comprising:

a storage configured to store the initialization value.

13. The display driver of claim 10, wherein controlling the luminance level of the first outmost light source is further based on second pixel data of second pixels of the plurality of pixels, the second pixels being located in adjacent zones of the plurality of zones, the adjacent zones being adjacent to the first outmost zone.

14. The display driver of claim 13, wherein the backlight control circuit is further configured to:

receive an initialization value corresponding to a position of a corner of the first outmost zone in the extended zone;

determine, based on the initialization value, filter coefficients for the first pixels located in the first outmost zone and the second pixels located in the adjacent zones; and apply the determined filter coefficients to the first pixel data of the first pixels and the second pixel data of the second pixels to generate filtered pixel data of the first pixels and the second pixels, and wherein controlling the luminance level of the first outmost light source is based on the filtered pixel data of the first pixels and the second pixels.

15. The display driver of claim 14, wherein the backlight control circuit is further configured to determine a sum of values of the filtered pixel data of the first pixels and the second pixels, and wherein controlling the luminance level of the first outmost light source is based on the sum of the values of the filtered pixel data.

16. The display driver of claim 15, wherein the backlight control circuit is further configured to:

receive a normalization value for the first outmost zone; and calculate a normalized sum by dividing the sum of the values of the filtered pixel data by the normalization value, and wherein controlling the luminance level of the first outmost light source is based on the normalized sum.

17. A method, comprising:

illuminating, by a backlight device comprising an array of light sources, a display area of a display panel, wherein the display area is segmented into a plurality of zones corresponding to the light sources, respectively, the plurality of zones comprising:

inner zones corresponding to inner light sources of the array of light sources, wherein the inner zones are located apart from edges of the display area of the display panel, and wherein each of the inner light sources is located at a center of a respective inner zone; and outmost zones located along the edges of the display area of the display panel and corresponding to outmost light sources of the array of light sources, wherein each of the outmost zones is different in size or shape from at least one inner zone which is adjacent to at least one outmost zone;

driving, by a driver circuit, a plurality of pixels located in the display area; and controlling, by a backlight control circuit, a luminance level of a first outmost light source of the array of light sources based on first pixel data of first pixels of the plurality of pixels, the first pixels being located in a first outmost zone of the outmost zones, the first outmost light source corresponding to the first outmost zone;

wherein the first outmost zone is defined to be an overlapping area of an extended zone and the display area of the display panel;

wherein the extended zone is defined such that the extended zone has the same size and shape as a first inner zone of the inner zones and that the first outmost light source is located at the center of the extended zone; and wherein the first inner zone is adjacent to the first outmost zone.

18. The method of claim 17, further comprising:

receiving, by the backlight control circuit, an initialization value corresponding to a position of a corner of the first outmost zone in the extended zone;

determining, by the backlight control circuit, based on the initialization value, filter coefficients for the first pixels located in the first outmost zone; and applying, by the backlight control circuit, the determined filter coefficients to the first pixel data of the first pixels located in the first outmost zone to generate filtered pixel data of the first pixels, and wherein controlling the luminance level of the first outmost light source is based on the filtered pixel data of the first pixels.

19. The method of claim 17, wherein controlling the luminance level of the first outmost light source is further based on second pixel data of second pixels of the plurality of pixels, the second pixels being located in adjacent zones of the plurality of zones, the adjacent zones being adjacent to the first outmost zone.

20. The method of claim 19, further comprising:

receiving, by the backlight control circuit, an initialization value corresponding to a position of a corner of the first outmost zone in the extended zone;

determining, by the backlight control circuit, based on the initialization value, filter coefficients for the first pixels located in the first outmost zone and the second pixels located in the adjacent zones; and applying, by the backlight control circuit, the determined filter coefficients to the first pixel data of the first pixels and the second pixel data of the second pixels to generate filtered pixel data of the first pixels and the second pixels, and wherein controlling the luminance level of the first outmost light source is based on the filtered pixel data of the first pixels and the second pixels.

* * * * *